US012621629B2

(12) United States Patent
Francl et al.

(10) Patent No.: US 12,621,629 B2
(45) Date of Patent: May 5, 2026

(54) HRTF DETERMINATION USING A HEADSET AND IN-EAR DEVICES

(71) Applicant: Meta Platforms Technologies, LLC, Menlo Park, CA (US)

(72) Inventors: Andrew Francl, Redmond, WA (US); Tobias Daniel Kabzinski, Aachen (DE); Hao Lu, Redmond, WA (US); Antje Ihlefeld, Redmond, WA (US); William Owen Brimijoin, II, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 148 days.

(21) Appl. No.: 18/597,643

(22) Filed: Mar. 6, 2024

(65) Prior Publication Data

US 2024/0305951 A1     Sep. 12, 2024

Related U.S. Application Data

(60) Provisional application No. 63/488,895, filed on Mar. 7, 2023.

(51) Int. Cl.
*H04S 7/00*          (2006.01)
*G02B 27/00*        (2006.01)
*G02B 27/01*        (2006.01)

(52) U.S. Cl.
CPC .......... *H04S 7/306* (2013.01); *G02B 27/0093* (2013.01); *G02B 27/0172* (2013.01);
(Continued)

(58) Field of Classification Search
CPC . H04S 7/306; H04S 2420/01; G02B 27/0093; G02B 27/0172; G02B 2027/0138
(Continued)

(56) References Cited

U.S. PATENT DOCUMENTS 9,681,250 B2     6/2017  Luo et al.
10,798,514 B2   10/2020  Reijniers et al.
(Continued)

OTHER PUBLICATIONS

Geronazzo M., et al., "A Minimal Personalization of Dynamic Binaural Synthesis with Mixed Structural Modeling and Scattering Delay Networks," ICASSP 2020-2020 IEEE International Conference on Acoustics, Speech and Signal Processing (ICASSP), May 2020, pp. 411-415.
(Continued)

*Primary Examiner* — Thjuan K Addy
(74) *Attorney, Agent, or Firm* — Greenberg Traurig, LLP

(57) ABSTRACT

Techniques for determining personalized head-related transfer functions (HRTFs) using a head-mounted device and in-ear devices include: receiving, from a sensor array of the head-mounted device, a first sound signal associated with a sound from a sound source in a local environment of a user of the head-mounted device; determining that reverberation characteristics and spectral characteristics of the sound meet predetermined criteria based on the first sound signal; determining that the sound source is stationary within a time period; determining a relative location of the sound source with respect to the user; receiving, from an in-ear device in an ear of the user, a second sound signal associated with the sound from the sound source; and determining, based on at least the second sound signal, an HRTF or one or more parameters of the HRTF associated with the relative location of the sound source for the user.

20 Claims, 12 Drawing Sheets

(52) U.S. Cl.
  CPC ............... *G02B 2027/0138* (2013.01); *G02B 2027/014* (2013.01); *H04R 2499/15* (2013.01); *H04S 2400/11* (2013.01); *H04S 2420/01* (2013.01)

(58) Field of Classification Search
  USPC ........................... 381/309, 300, 306, 307, 26
  See application file for complete search history.

(56) References Cited

U.S. PATENT DOCUMENTS

| | | | |
|---|---|---|---|
| 11,082,794 B2 | 8/2021 | Alon et al. | |
| 11,146,908 B2 | 10/2021 | Mohapatra et al. | |
| 11,190,896 B1 | 11/2021 | Satongar et al. | |
| 11,457,325 B2 | 9/2022 | Brimijoin, II et al. | |
| 2021/0314720 A1 | 10/2021 | Khaleghimeybodi et al. | |
| 2022/0182772 A1* | 6/2022 | Dodds ................... | H04R 1/1075 |
| 2022/0342213 A1* | 10/2022 | Lu ........................... | G06F 3/012 |
| 2023/0380739 A1* | 11/2023 | Ihlefeld ................ | A61B 5/7225 |

OTHER PUBLICATIONS

Middlebrooks J.C., "Individual Differences in External-Ear Transfer Functions Reduced by Scaling in Frequency," The Journal of the Acoustical Society of America, Sep. 1, 1999, vol. 106, No. 03, pp. 1480-1492.

Middlebrooks J.C., "Virtual Localization Improved by Scaling Nonindividualized External-Ear Transfer Functions in Frequency," The Journal of the Acoustical Society of America, Sep. 1, 1999, vol. 106, No. 03, pp. 1493-1510.

International Preliminary Report on Patentability for International Application No. PCT/US2024/018835, mailed Sep. 18, 2025, 8 pages.

International Search Report and Written Opinion for International Application No. PCT/US2024/018835, mailed Jun. 17, 2024, 12 pages.

\* cited by examiner

300
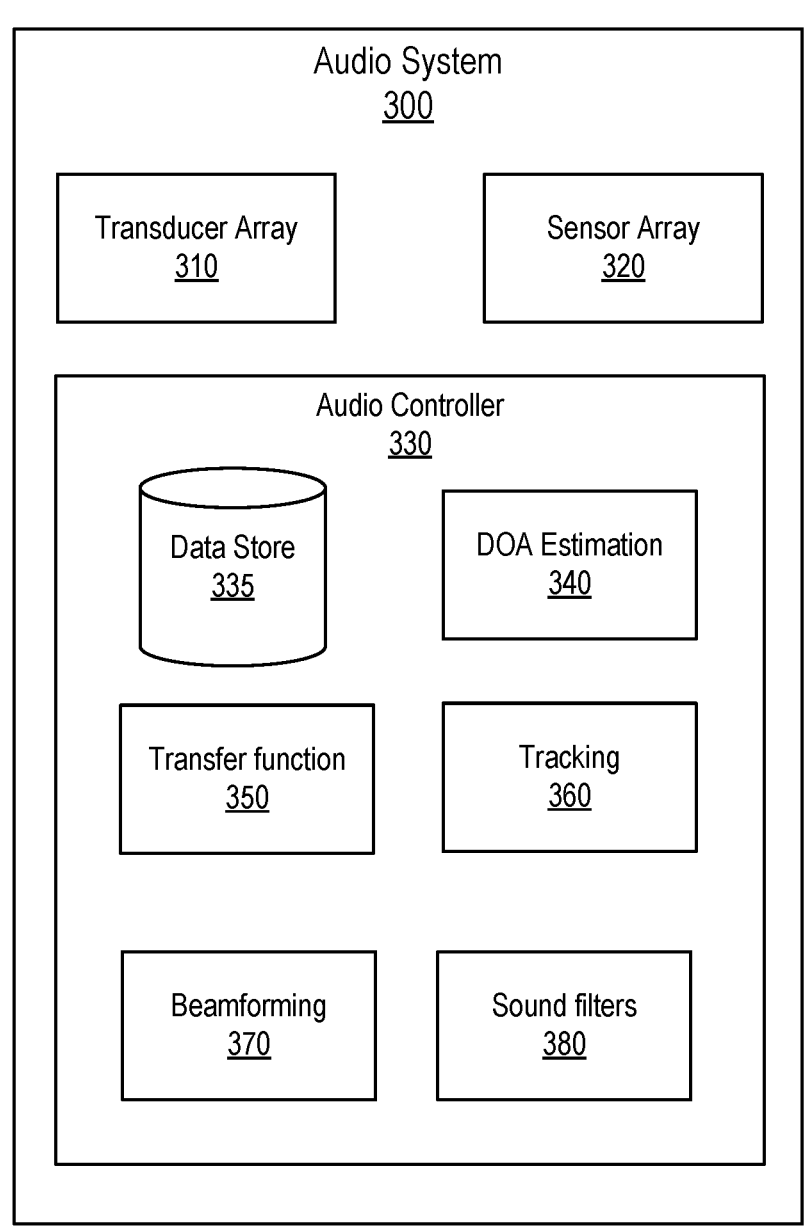
FIG. 3

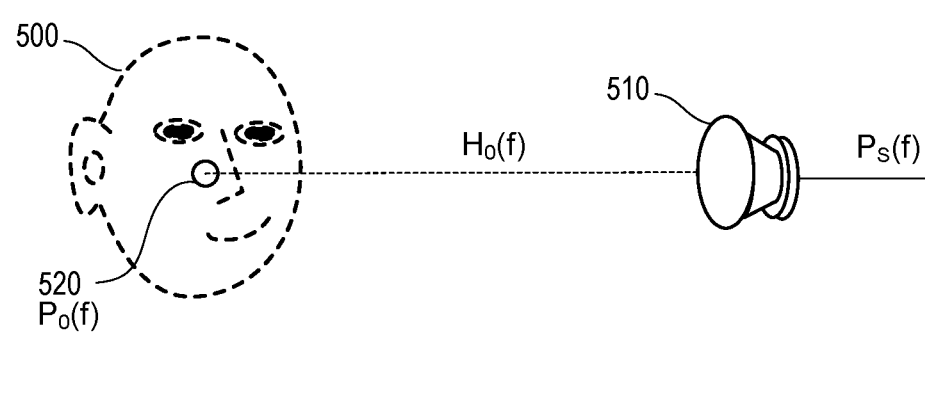
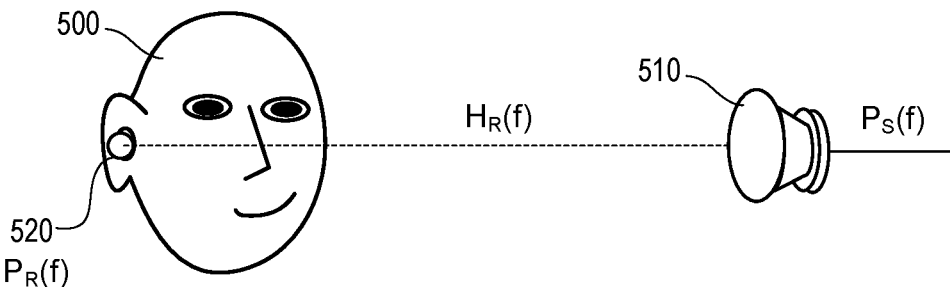
FIG. 5A
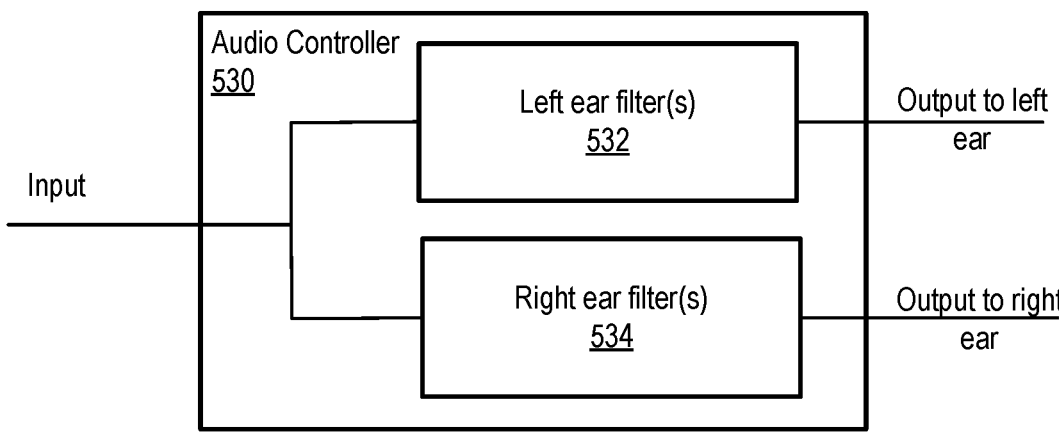
FIG. 5B

700

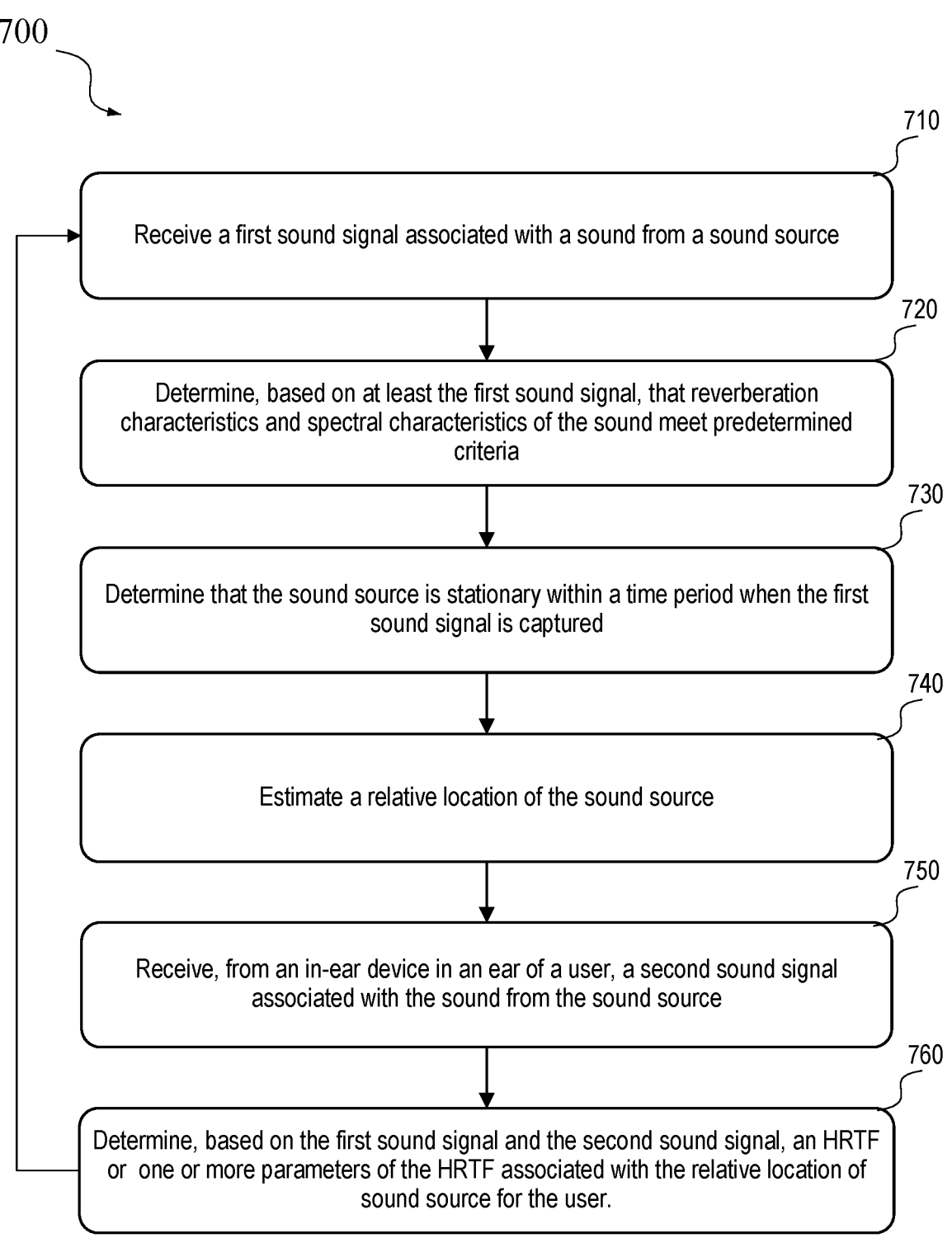

710

Receive a first sound signal associated with a sound from a sound source

720

Determine, based on at least the first sound signal, that reverberation characteristics and spectral characteristics of the sound meet predetermined criteria

730

Determine that the sound source is stationary within a time period when the first sound signal is captured

740

Estimate a relative location of the sound source

750

Receive, from an in-ear device in an ear of a user, a second sound signal associated with the sound from the sound source

760

Determine, based on the first sound signal and the second sound signal, an HRTF or one or more parameters of the HRTF associated with the relative location of sound source for the user.

HRTF DETERMINATION USING A HEADSET AND IN-EAR DEVICES

CROSS-REFERENCE TO RELATED APPLICATION

This application claims the benefit of and priority to U.S. Provisional Application No. 63/488,895, filed Mar. 7, 2023, entitled "HRTF DETERMINATION USING A HEADSET AND IN-EAR DEVICES," which is hereby incorporated by reference in its entirety.

BACKGROUND

An artificial reality system, such as a head-mounted display (HMD) or heads-up display (HUD) system, generally includes a near-eye display system in the form of a headset or a pair of glasses and configured to present content to a user via an electronic or optic display that is within, for example, about 10-20 mm in front of the user's eyes. The near-eye display system may display virtual objects or combine images of real objects with virtual objects, as in virtual reality (VR), augmented reality (AR), or mixed reality (MR) applications. A near-eye display generally includes an optical system configured to form an image of a computer-generated image displayed by an image source (e.g., a display panel). For example, the optical system may relay the image generated by the image source to create a virtual image that appears to be further than just a few centimeters away from the user's eyes. In addition to displaying virtual images at target image planes, spatial sound or three-dimensional (3D) sound rendering such that the user may perceive the sound of a virtual object that appears to originate from the target location of the virtual object may also be needed in AR/VR systems in order to enhance the immersive user experience for successful realization of the VR/AR systems. Personalized transfer functions describing the way sound interacts with the user's head and torso before reaching user's ear canals may be used to render high-fidelity spatial sound.

SUMMARY

This disclosure relates generally to determining head-related transfer functions (HRTFs), and more specifically, to HRTFs or HRTF parameters determination using a head-mounted device (e.g., a headset) and in-ear devices. Various inventive embodiments are described herein, including devices, systems, methods, structures, processes, and the like.

According to certain embodiments disclosed herein, a method may include: receiving, from a sensor array of a head-mounted device, a first sound signal associated with a sound from a sound source in a local environment of a user of the head-mounted device; determining, based on the first sound signal, that reverberation characteristics and spectral characteristics of the sound meet predetermined criteria; determining that the sound source is stationary within a time period; determining a relative location of the sound source with respect to the user; receiving, from an in-ear device in an ear of the user, a second sound signal associated with the sound from the sound source; and determining, based on at least the second sound signal, a head-related transfer function (HRTF) or one or more parameters of the HRTF associated with the relative location of the sound source for the user.

According to certain embodiments disclosed herein, a system for HRTF measurement may include an in-ear device and a head-mounted device. The in-ear device may be configured to generate a first sound signal associated with a sound from a sound source in a local environment of a user. The head-mounted device may include a sensor array configured to generate a second sound signal associated with the sound, and an audio controller. The audio controller may be configured to: determine, based on the second sound signal, that reverberation characteristics and spectral characteristics of the sound meet predetermined criteria; determine that the sound source is stationary within a time period; determine a relative location of the sound source with respect to the user; and determine, based on at least the first sound signal, a head-related transfer function (HRTF) or one or more parameters of the HRTF associated with the relative location of the sound source for the user.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 3 is a block diagram of an example of an audio system in a near-eye display according to certain embodiments.

FIG. 5A illustrates an example of measuring a head-related transfer function (HRTF) for a user.

FIG. 5B illustrates an example of generating spatialized audio content based on the HRTFs for a user.

FIG. 7 includes a flowchart illustrating an example of a process of determining the HRTFs (or parameters of the HRTFs) for a user using a head-mounted device and in-ear devices, according to certain embodiments.

Figure 1:
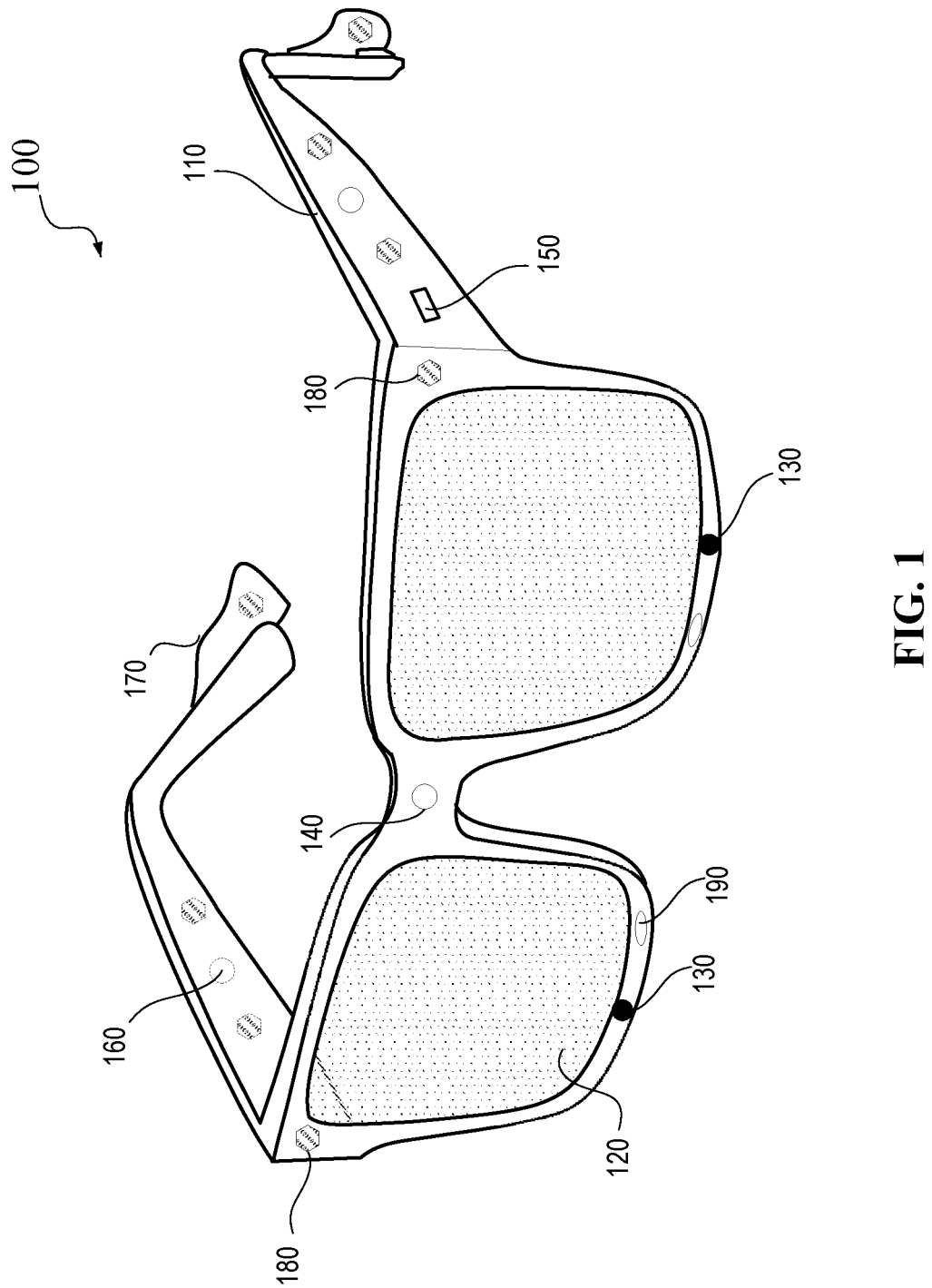
FIG. 1 is a perspective view of an example of a near-eye display in the form of a pair of glasses for implementing some of the examples disclosed herein.

The figures depict various embodiments for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to determining head-related transfer functions (HRTFs), and more specifically, to HRTFs or HRTF parameters determination using a head-mounted device (e.g., a headset) and in-ear devices. Various inventive embodiments are described herein, including devices, systems, methods, structures, processes, and the like.

In virtual reality (VR), augmented reality (AR), or other near-eye display systems, to improve the immersive experience of using the near-eye display systems, it may be desirable to render spatialized audio content for multiple channels (e.g., based on a single channel input audio signal) such that the user may hear the sound of a virtual object as if the sound was originated from the target location of the virtual object, in addition to foveated image rendering and improving the image quality (e.g., high resolution, large color gamut, large field of view, etc.). To generate such spatialized audio content, the audio rendering may be performed in, for example, a binaural configuration or a transaural configuration. In a binaural configuration through headphones or in-eye devices (IEDs, such as ear plugs), acoustic transfer functions that characterize the modifications of the sound on the path from the (virtual) sound source to the user's ears may need to be determined, before generating binaural sounds using, for example, transducers, such that the headphones or IEDs may modify (e.g., filter) a sound signal using the acoustic transfer functions to synthesize a binaural sound that appears to be from a particular point in space, and the user may infer the spatial location of the sound source based on localization cues in the binaural sounds.

The modifications of the sound on the path from the (virtual) sound source to the listener's ears may include attenuating signals of different frequencies differently, and may depend on, for example, the size and shape of the user's outer ear (e.g., pinna), the size, shape, and density of the user's head and/or torso, the acoustic characteristics of the space in which the sound is played, and the like. As such, the acoustic transfer function between the sound source and an ear (e.g., at the outer end of the auditory canal) of a user may be referred to as a head-related transfer function (HRTF) or a head shadow. HRTFs may include relevant acoustic cues for localizing real sound sources, such as interaural level differences (ILDs), interaural time differences (ITDs), and monoaural spectral cues. The time domain representation of the HRTF is the head-related impulse response (HRIR). The HRTF depends on the direction of the sound source with respect to the center of the head, and the HRTF for the left ear and the HRTF for the right ear may be different for a sound source at a given location. The relative position of the user's torso with respect to the user's head may also affect the HRTFs. Due to the different anatomy (e.g., sizes and shapes of the pinna, head, and torso) of different users, the HRTFs for different users are generally different. Therefore, an HRTF that works well for one user may not work well for another user. Using non-personalized HRTFs to synthesize binaural sounds may degrade the listening experience, such as reducing the localization accuracy and perceived externalization.

HRTFs are typically measured in an anechoic chamber (e.g., using a dummy) to minimize the influence of early reflection and reverberation on the measured response. HRTFs may be measured at small increments in the azimuth angle and elevation angle, with interpolation used to synthesize HRTFs for arbitrary locations. With the small increments in the azimuth angle and elevation angle, HRTFs for many (e.g., more than 100 such as a few hundred) spatial locations may need to be measured. Even with the small increments, interpolation can lead to front-back confusion, and can be difficult to optimize. In addition, as discussed above, HRTFs differ from person to person because the sound propagation varies due to the sizes and shapes of the head, torso, and pinna of each person. Applying the HRTFs measured from a dummy or another person to a specific person can degrade the performance of immersive sound effects due to the variance in the personal characteristics. Therefore, HRTFs need to be personalized to obtain the desired localization performance. However, the process of creating personalized HRTFs based on measurements in an anechoic chamber may use specialized and expensive measurement systems, and can be time-consuming and computationally intensive. Therefore, such processes may not be scalable to a large number of users.

According to certain embodiments disclosed herein, a head-mounted device and in-ear devices (IEDs, which may or may not be a part of the head-mounted device) worn by a user may be used to determine personalized HRTFs or at least some parameters of personalized HRTFs for the user by, for example, capturing audio signals in the natural environment that are suitable for HRTF measurement, estimating the locations (e.g., directions) of the sound sources of the captured audio signals, and determining the HRTFs for the locations based on audio signals captured by the head-mounted device and the in-ear devices. As such, the head-mounted device and in-ear devices can listen to incidental sounds opportunistically in the user's natural environment with minimum or no user involvement to gradually add data points associated with different spatial locations to a data point cloud of the user's personalized HRTFs, such that user-specific HRTFs across all desired source directions may be built over time. The head-mounted device and in-ear devices may be worn by the user for other purposes (e.g., AR/VR applications) over a period of time (e.g., days or weeks) to accumulate the HRTFs or parameters of the HRTFs for different directions. In this way, the HRTFs or parameters of the HRTFs for the user may be determined with minimum or no user involvement, and without using a specialized measurement system, such as a sound dampening chamber and an array of speakers. In some implementations, when HRTFs for a sufficient number of directions have been collected, the HRTFs may be interpolated to generate a personalized HRTF for any arbitrary sound source direction for the user.

Each sound signal captured by the head-mounted device and the IEDs can have a short duration (e.g., a few seconds, a few hundred milliseconds, or tens of milliseconds, such as clicks or other very short duration pulses), and/or a frequency band that may be at least a fraction of the human hearing range (e.g., between about 20 Hz to 20 kHz). An HRTF for the entire human hearing range may be determined using a set of sound signals, where each sound signal may cover a different respective frequency range. In some implementations, the HRTF for a fraction of the human hearing range may be determined by averaging the results determined using multiple sound signals to improve the accuracy. In some embodiments where the different frequency bands of an HRTF may be implemented using different filters, the filters may be selected based on the HRTF for fractions of the human hearing range determined using different sound signals covering different fractions of the human hearing range. In some implementations, the HRTFs or the parameters of the HRTFs may be used to personalize a non-personalized HRTF, for example, by personalizing the interaural time difference (ITD) and parameter scaling factors, such as factors for compressing or stretching the magnitude spectrum of the HRTF in frequency domain (referred to herein as the frequency scaling factor).

The head-mounted device used for generating HRTFs or parameters of the HRTFs may be an AR/VR system that includes, for example, a microphone array and an audio controller. The head-mounted device may include one or more IEDs or may be in communication with the one or more IEDs worn by the user of the head-mounted device. In some implementations, the head-mounted device may include or may communicate with a camera system and/or another sensor system (e.g., the microphone array) that can be used to determine the location (e.g., direction) of an object that generates the sounds. The microphone array and/or the IEDs may be used to capture audio signals in the natural environment, and the captured audio signals may be analyzed by the audio controller to determine if they are suitable for HRTF measurement. For example, a sound suitable for personalized HRTF measurement may have a high spatial stationarity (at least while the sound is being captured by the head-mounted device and in-ear devices, such as within 1 second, within a few hundred milliseconds, or within tens of milliseconds), and may also have a high signal-to-noise ratio (SNR), a low reverberation level, a low reverberation time (e.g., low RT60), a broad frequency spectrum, and the like.

The direction or location of the sound source of a sound that is suitable for HRTF measurement may be determined based on, for example, the direction of arrival (DOA) determined using two or more microphones (e.g., in the microphone array of the head-mounted device), one or more cameras on or communicated with the head-mounted device, or the like. In some implementations, the one or more cameras, or one or more position sensors (e.g., inertial measurement units (IMUs)) on the head-mounted device may be used to determine a relative position of the user's torso with respect to the user's head, because the HRTF may be affected by the relative position of the user's torso with respect to the user's head.

The audio signals captured by the microphone array may be used to determine an approximately anechoic reference signal (e.g., by beamforming in the estimated direction of the sound source to determine a reference sound signal) for use in determining the head-related transfer function. The audio signals captured by the IEDs may be used to determine the HRTF or parameters of the HRTF for the sound source direction (and the relative position of the user's torso with respect to the user's head) by dividing the audio signals captured by the IEDs using the reference signal determined based on the audio signals captured by the microphone array.

In some implementations, it may be possible to approximate the HRTFs of different users through low-complexity signal processing using parameters in a lower-dimensional parameter space. For example, in some implementations, the lower-dimensional parameters of the HRTFs determined using the techniques disclosed herein may include the ITD and lower-dimensional parameters of the HRTFs for a sound source direction, such as parameters of filters (e.g., the center frequency, gain, and Q values of the filters, or other parameters for defining the filters) for implementing the HRTFs. In some examples, the lower-dimensional parameters of the HRTFs determined using the techniques disclosed herein may include personalized ITDs and personalized parameter scaling factors for personalizing non-personalized HRTFs. In some implementations, to determine the parameters in the lower-dimensional parameter space for HRTF rendering, a set of parameters (e.g., filter parameters or frequency scaling factors) may be initialized and then optimized to match the measured HRTFs for a sound source direction. In some implementations, machine learning models such as neural networks may be trained to fit HRTFs using lower-dimensional parameters (e.g., filter parameters or frequency scaling factors) in such a way that the parameters may vary smoothly across space and behave analogously across different users.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or a combination thereof, any of which may be presented in a single channel or in multiple channels (such as stereo video that produces a three-dimensional effect to the viewer). Additionally, in some embodiments, artificial reality may also be associated with applications, products, accessories, services, or a combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a perspective view of an example of a near-eye display (NED) 100 in the form of a pair of glasses for implementing some of the examples disclosed herein. In general, NED 100 may be worn on the head (e.g., face) of a user such that content (e.g., media content) may be presented to the user using a display assembly and/or an audio system. However, NED 100 may also be used such that media content is presented to a user in a different manner. Examples of media content presented by NED 100 include images, videos, audios, or combinations thereof. In the illustrated example, NED 100 includes a frame 110, and may include, among other components, a display assembly including one or more display elements 120, a depth camera assembly (DCA), an audio system, and one or more position sensors 190. While FIG. 1 illustrates the components of NED 100 in certain locations on NED 100, the components may be located elsewhere on NED 100, on a peripheral device paired with NED 100, or a combination thereof. Similarly, there may be more or fewer components on NED 100 than what is shown in FIG. 1.

Frame 110 may hold the other components of NED 100. Frame 110 may include a front part that holds the one or more display elements 120 and end pieces (e.g., temples) for attaching NED 100 to a head of the user. The front part of frame 110 may bridge the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 may provide light to a user wearing NED 100. As illustrated, NED 100 includes a display element 120 for each eye of the user. In some embodiments, a display element 120 generates image light that is provided to an eyebox of NED 100. The eyebox is a location in space that an eye of user occupies while wearing NED 100. For example, a display element 120 may include a waveguide display. A waveguide display includes a light source (e.g., a two-dimensional source, one or more line sources, one or more point sources, etc.) and one or more waveguides. Display light from the light source may be in-coupled into the one or more waveguides, which may replicate the display light and outcouple the display light from an array of locations of the waveguides to replicate the pupil in an eyebox of NED 100. In-coupling and/or outcoupling of light from the one or more waveguides may be done using, for example, one or more diffraction gratings or mirrors. In some embodiments, the waveguide display may include a scanning element (e.g., waveguide, mirror, etc.)

that scans light from the light source as it is in-coupled into the one or more waveguides. In some embodiments, one or both of display elements 120 may be opaque and may not transmit light from the ambient environment surrounding NED 100. For example, the ambient environment may be a room which a user wearing NED 100 is inside, or the user wearing NED 100 may be outside and the ambient environment may be an outdoor area. In this context, NED 100 may generate and present VR content. Alternatively, in some embodiments, one or both of the display elements 120 are at least partially transparent, such that light from the ambient environment may be combined with light from the one or more display elements to produce and present AR and/or MR content.

In some embodiments, a display element 120 may not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, display elements 120 may be polarized and/or tinted to protect the user's eyes from the sun. In some embodiments, display elements 120 may include additional display optics (not shown). The display optics may include one or more optical elements (e.g., lens, Fresnel lens, etc.) that direct light from the display element 120 to the eyebox. The display optics may, for example, correct for aberrations in some or all of the image content, magnify some or all of the image, or a combination thereof.

The depth camera assembly (DCA) may determine depth information for a portion of a local area surrounding NED 100. The DCA may include, for example, one or more imaging devices 130 and a DCA controller (not shown in FIG. 1), and may also include an illuminator 140 in some implementations. For example, illuminator 140 may be used to illuminate a portion of the local area with light. The light may be, for example, flash light, structured light (e.g., dot pattern, bars, etc.) in the visible or infrared (IR) band. In some embodiments, one or more imaging devices 130 (e.g., cameras) may capture images of the portion of the local area that include the light from illuminator 140. In some implementations, NED 100 may include one or more photo sensors (e.g., IR sensors, not shown in FIG. 1) that may detect the light from illuminator 140 and reflected by objects in the ambient environment to determine the time of flight and the distance between the objects and NED 100. FIG. 1 shows a single illuminator 140 and two imaging devices 130 in the illustrated example. In alternate embodiments, there may be zero to multiple illuminators 140, zero to multiple imaging devices 130, and zero to multiple photo sensors. The DCA controller may determine depth information for the portion of the local area using the captured images and one or more depth determination techniques, such as direct time-of-flight (ToF) depth sensing, indirect ToF depth sensing, structured light, passive stereo analysis, active stereo analysis (e.g., uses texture added to the scene by light from the illuminator 140), some other techniques to determine depth of a scene, or a combination thereof.

The audio system of NED 100 may provide audio content. The audio system may include, for example, a transducer (e.g., speaker) array, an acoustic sensor (e.g., microphone) array, and an audio controller 150. In other embodiments, the audio system may include different and/or additional components. In some examples, functionality described with reference to the components of the audio system can be distributed among the components in a different manner than is described here. For example, some or all of the functions of the controller may be performed by a remote server or a processor of NED 100.

The transducer array may include a plurality of transducers that present sound to user. A transducer may be a speaker 160 or a tissue transducer 170 (e.g., a bone conduction transducer or a cartilage conduction transducer). Although speakers 160 are shown exterior to frame 110 in the illustrated example, speakers 160 may be enclosed in the frame 110 in some examples. In some embodiments, instead of individual speakers for each ear, NED 100 may include a speaker array comprising multiple speakers integrated into the frame 110 to improve directionality of presented audio content. Tissue transducer 170 may be couple to the head of the user and may directly vibrate tissue (e.g., bone or cartilage) of the user to generate sound. The number and/or locations of the transducers in the transducer array may be different from what is shown in FIG. 1.

The acoustic sensor array may detect sounds within the local area of NED 100. The acoustic sensor array includes a plurality of acoustic sensors 180. An acoustic sensor 180 may capture sounds emitted from one or more sound sources in the local area (e.g., a room). Each acoustic sensor is configured to detect sound and convert the detected sound into an electronic (analog or digital) signal. Acoustic sensors 180 may be acoustic wave sensors, microphones, sound transducers, or similar sensors that are suitable for detecting sounds. In some embodiments, one or more acoustic sensors 180 may be placed in an ear canal of each ear (e.g., acting as binaural microphones). In some embodiments, acoustic sensors 180 may be placed on an exterior surface of NED 100, on an interior surface of NED 100, separate from NED 100 (e.g., part of some other devices), or some combinations thereof. In different embodiments, the number and/or locations of acoustic sensors 180 may be different from what is shown in FIG. 1. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing NED 100.

Audio controller 150 may process information from the acoustic sensor array that describes sounds detected by the acoustic sensor array. Audio controller 150 may include a processor and one or more computer-readable storage media, and may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for speakers 160, or a combination thereof. In some embodiments, audio controller 150 may selects an audio time and level difference renderer (TLDR) that approximates a given HRTF at a particular level of accuracy. For example, the TLDR may be selected based on input parameters such as a target power consumption, a target compute load specification, target memory footprint, a target level of accuracy of HRTF approximation, or a combination thereof. In these embodiments, audio controller 150 may select an audio TLDR from a set of audio TLDRs based on the input target level of accuracy, and configure the selected audio TLDR based on input parameters such as a target sound source angle and a target fidelity of audio rendering. Audio controller 150 may apply the selected and configured audio TLDR(s) to an input audio signal received at a single channel to generate multi-channel spatialized audio content for providing to speakers 160.

Position sensors 190 may generate one or more measurement signals in response to motion of NED 100. Position sensors 190 and imaging devices 130 may be used alone or in combination to determine, for example, a relative position of the user's torso with respect to the user's head. Position sensors 190 may be located on a portion of frame 110 of NED 100. Position sensors 190 may include, for example, inertial measurement units (IMUs). Position sensors 190 include, for example, one or more accelerometers, one or more gyroscopes, one or more magnetometers, another suitable type of sensor that detects motion, a type of sensor used for error correction of the IMU, or a combination thereof. Position sensors 190 may be located external to the IMU, internal to the IMU, or a combination thereof.

In some embodiments, NED 100 may include simultaneous localization and mapping (SLAM) functionality for determining a position of NED 100 and updating of a model of the local area. For example, NED 100 may include a passive camera assembly (PCA) that generates color image data. The PCA may include one or more RGB cameras that capture images of some or all of the local area. In some embodiments, some or all of imaging devices 130 of the DCA may also function as the PCA. The images captured by the PCA and the depth information determined by the DCA may be used to determine parameters of the local area, generate a model of the local area, update a model of the local area, determine a position of the user, or a combination thereof. In some embodiments, position sensors 190 may track the position (e.g., location and pose) of the user of NED 100 within the room. Additional details regarding the components of NED 100 are discussed below.

Figure 2:
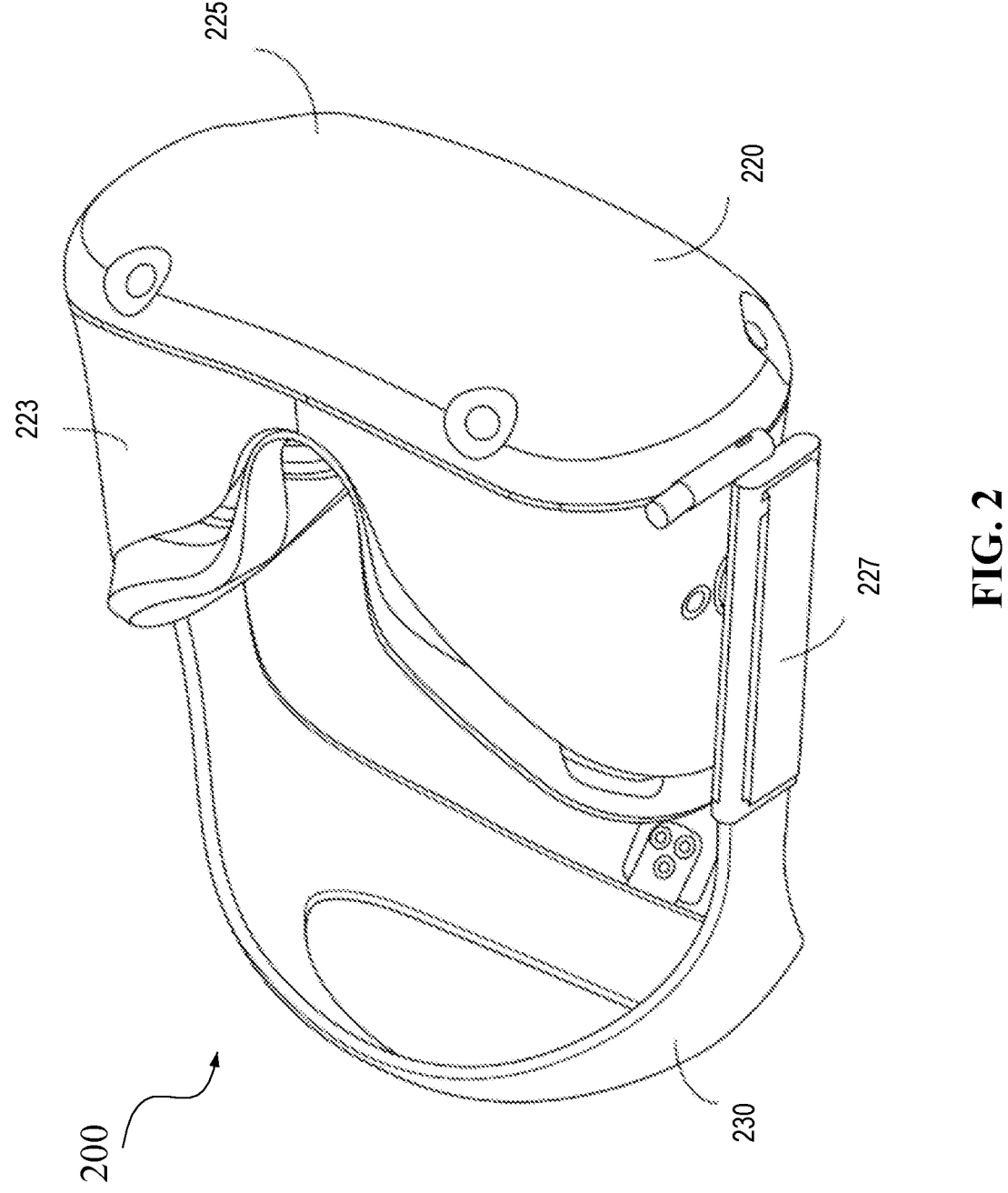
FIG. 2 a perspective view of an example of a near-eye display in the form of a head-mounted display (HMD) device for implementing some of the examples disclosed herein.

FIG. 2 is a perspective view of an example of a near-eye display in the form of a head-mounted display (HMD) 200 for implementing some of the examples disclosed herein. HMD 200 may be a part of, for example, a VR system, an AR system, an MR system, or any combination thereof. HMD 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD 200 for allowing a user to mount HMD 200 onto the user's head. HMD 200 may include at least some components of NED 100 described above. In some embodiments, HMD 200 may include additional, fewer, or different components.

HMD 200 may present to a user media including virtual and/or augmented views of a physical, real-world environment with computer-generated elements. Examples of the media presented by HMD 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMOLED, a TOLED, some other display, or any combination thereof. HMD 200 may include two eye box regions.

In some implementations, HMD 200 may include various sensors (not shown), such as depth sensors, motion sensors, position sensors, acoustic sensors, and eye tracking sensors. Some of these sensors may use a structured light pattern for sensing. In some implementations, HMD 200 may include an input/output interface for communicating with a console. In some implementations, HMD 200 may include a virtual reality engine (not shown) that can execute applications within HMD 200 and receive depth information, position information, acceleration information, velocity information, predicted future positions, or any combination thereof of HMD 200 from the various sensors. In some implementations, the information received by the virtual reality engine may be used for producing a signal (e.g., display instructions) to the one or more display assemblies. In some implementations, HMD 200 may include locators (not shown) located in fixed positions on body 220 relative to one another and relative to a reference point. Each of the locators may emit light that is detectable by an external imaging device. HMD 200 may also include an audio system that may include, for example, a transducer (e.g., speaker) array, an acoustic sensor (e.g., microphone) array, and an audio controller, as described above with respect to FIG. 1. As also described above, the audio system may need to provide spatial sound or three-dimensional (3D) sound rendering, such that the user may perceive the sound of a virtual object that appears to originate from the target location of the virtual object, for immersive user experience and successful realization of VR/AR systems.

FIG. 3 is a block diagram of an example of an audio system 300 in a near-eye display or head-mounted display according to certain embodiments. Audio system 300 may be an example of an implementation of the audio system in FIG. 1 or FIG. 2. Audio system 300 may generate one or more acoustic transfer functions for a user, and may implement the one or more acoustic transfer functions to generate audio content for the user. In the example shown in FIG. 3, audio system 300 includes a transducer array 310, a sensor array 320, and an audio controller 330. Some other embodiments of audio system 300 may have different components than those shown in FIG. 3. In some embodiments, functions of audio system 300 may be distributed among the components in a manner different from the manner described herein.

As described above, transducer array 310 may be configured to present audio content to the user, and may include a plurality of transducers positioned at different locations of the head-mount display or near-eye display (generally referred to as a headset). A transducer is a device that provides audio content. A transducer may be, for example, a speaker (e.g., speaker 160), a tissue transducer (e.g., tissue transducer 170), or another device that can provide audio content. A tissue transducer may be configured to function as a bone conduction transducer or a cartilage conduction transducer. Transducer array 310 may present audio content via air conduction (e.g., via one or more speakers), via bone conduction (via one or more bone conduction transducer), via cartilage conduction (via one or more cartilage conduction transducers), or a combination thereof. In some embodiments, transducer array 310 may include one or more transducers to cover different parts of a frequency range. For example, a piezoelectric transducer may be used to cover a first part of a frequency range, and a moving coil transducer may be used to cover a second part of a frequency range.

Bone conduction transducers may generate acoustic pressure waves by vibrating bone/tissue in the user's head. A bone conduction transducer may be coupled to a portion of a headset, and may be configured to be behind the auricle coupled to a portion of the user's skull. The bone conduction transducer may receive vibration instructions from audio controller 330, and vibrate a portion of the user's skull based on the received instructions. The vibrations from the bone conduction transducer may generate a tissue-borne acoustic pressure wave that propagates toward the user's cochlea, bypassing the eardrum.

Cartilage conduction transducers may generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portions of the auricular cartilage, or a combination thereof). Vibrating the one or more portions of auricular cartilage may generate, for example, airborne acoustic pressure waves outside the ear canal, tissue born acoustic pressure waves that cause some portions of the ear canal to vibrate thereby generating an airborne acoustic pressure wave within the ear canal, or a combination thereof. The generated airborne acoustic pressure waves may propagate down the ear canal toward the ear drum.

Transducer array 310 may generate audio content in accordance with instructions from audio controller 330. In some embodiments, the audio content is spatialized. Spatialized audio content is audio content that appears to originate from a particular direction and/or target region (e.g., an object in the local area and/or a virtual object in a target location). For example, spatialized audio content can cause a user of audio system 300 to perceive the sound as originating from a virtual singer at a certain location or direction (e.g., next door or on a stage) with respect to the user. Transducer array 310 may be coupled to or may be a part of a wearable device (e.g., NED 100 or HMD 200). In alternate embodiments, transducer array 310 may be a plurality of speakers that are separate from the wearable device (e.g., coupled to an external console). In some embodiments, transducer array 310 may include a pair of in-ear devices (e.g., in the form of earplugs).

Sensor array 320 may detect sounds within a local area surrounding sensor array 320. For example, sensor array 320 may include a plurality of acoustic sensors that can each detect air pressure variations of a sound wave and convert the detected air pressure variations into an electronic (analog or digital) signal. The plurality of acoustic sensors may be positioned on a wearable device (e.g., NED 100 or HMD 200), on a user (e.g., in the form of an earplug in an ear canal of the user or a headset over the ears the users), on a neckband, or a combination thereof. An acoustic sensor may include, for example, a microphone, a vibration sensor, an accelerometer, or another sensor capable of detecting air pressure variations. Two or more acoustic sensors of sensor array 320 may be used to, for example, determine a location of a sound source. In some embodiments, sensor array 320 may be configured to monitor the audio content generated by transducer array 310 using at least some of the plurality of acoustic sensors. Increasing the number of acoustic sensors may improve the accuracy of information (e.g., directionality) describing a sound field produced by transducer array 310 and/or sound from the local area.

Audio controller 330 may control the operation of audio system 300. Audio controller 330 may include, for example, a data store 335, a direction of arrival (DOA) estimation subsystem 340, a transfer function subsystem 350, a tracking subsystem 360, a beamforming subsystem 370, and a sound filter subsystem 380. Audio controller 330 may be located inside an HMD or a console connected to the HMD. Audio controller 330 may have different components than those shown in FIG. 3 in different embodiments. Functions of audio controller 330 may be distributed among the components in different manners than described here. For example, some functions of audio controller 330 may be performed external to the HMD. The user may allow the audio controller 330 to transmit data captured by the HMD to systems external to the HMD (e.g., a console or a server), and the user may select privacy settings controlling access to any such data.

Data store 335 may store data for use or generated by audio system 300. Data in data store 335 may include, for example, sounds recorded in the local area of audio system 300, audio content, head-related transfer functions (HRTFs), some parameters of the HRTFs, transfer functions for one or more sensors, array transfer functions (ATFs) for one or more of the acoustic sensors, sound source locations, virtual model of local area, direction of arrival estimates, sound filters, models (e.g., look-up tables) for retrieving HRTFs or parameters of HRTF based on the sound source direction, other data relevant for use or generated by the audio system 300, or any combination thereof.

For example, data store 335 may store the captured sound signals, sound source location information determined from the captured sound signals, HRTFs or at least some parameters of the HRTFs determined based on the captured sound signals and sound source location information. Some parameters of the HRTFs may be parameters in a lower-dimensional parameter space, such as parameters of individual filters (e.g., notch filters, bandpass filters, high-shelf filters, and/or low-shelf filters). Some parameters of the HRTFs may be modifications to a non-personalized HRTF in order to generate a personalized HRTF, such as frequency scaling factors, personalized interaural time differences (ITDs), and the like.

Data store 335 may also store data in association with the operation of sound filter subsystems 380 associated with the selection and application of an audio time and level difference renderer (TLDR). The stored data may include static filter parameter values, one dimensional and/or two dimensional interpolating look-up tables for looking up frequency/gain/Q triplet parameter values for a given azimuth angle and/or a given elevation angle of a target sound source, such as filter parameters (e.g., center frequency, notch filter depth, and slope), and the like. Data store 335 may also store single channel audio signals for processing by the audio TLDR and presentation to a user by the HMD as spatialized audio content through multiple channels. In some embodiments, data store 335 may store default values for input parameters such as target fidelity of the audio content rendering in the form of target frequency response values, target signal to noise ratios, target power consumption by a selected audio TLDR, target compute requirements of a selected audio TLDR, and target memory footprint of a selected audio TLDR. Data store 335 may store values such as a desired spectral profile and equalization for the generated spatialized audio content from the audio TLDR. In some embodiments, data store 335 may store a selection model for use in selecting an audio TLDR based on input parameter values. The stored selection model may be in the form of a look-up table that maps ranges of input parameter values to one of the audio TLDRs. In some embodiments, the stored selection model may be in the form of specific weighted combinations of the input parameter values that are mapped to one of the audio TLDRs. In some embodiments, the data store 335 may store data for use by a parametric filter fitting system. The stored data may include a set of measured HRTFs associated with context vectors, spatial location of a sound source, such as azimuth and elevation values, as well as anthropometric features of one or more users. Data store 335 may also store updated audio filter parameter values as determined by the parametric filter fitting system.

DOA estimation subsystem 340 may be configured to localize sound sources in the local area, for example, based at least in part on information from the sensor array 320. Localization is a process of determining where sound sources are located relative to the user of audio system 300. DOA estimation subsystem 340 may perform a DOA analysis to localize one or more sound sources within the local area. The DOA analysis may include analyzing the intensity, spectra, and/or arrival time of the sound at each acoustic sensor of sensor array 320 to determine the direction from which the sounds originated. The DOA analysis may include any suitable algorithm for analyzing a surrounding acoustic environment in which audio system 300 is located.

For example, the DOA analysis may be designed to receive input signals from sensor array 320 and apply digital signal processing algorithms to the input signals to estimate a direction of arrival. These algorithms may include, for example, delay and sum algorithms, where the input signal is sampled and the resulting weighted and delayed versions of the sampled signal are averaged together to determine a DOA. In another example, a least mean squared (LMS) algorithm may be implemented to create an adaptive filter, and the adaptive filter may then be used to identify differences in, for example, signal intensity or differences in time of arrival. These differences may then be used to estimate the DOA. In yet another example, the DOA may be determined by converting the input signals into the frequency domain and selecting specific bins within the time-frequency (TF) domain for processing. For example, each selected TF bin may be processed to determine whether that bin includes a portion of the audio spectrum with a direct path audio signal. Those bins having a portion of the direct-path signal may then be analyzed to identify the angle at which sensor array 320 received the direct-path audio signal. The determined angle may then be used to identify the DOA for the received input signal. Other algorithms not discussed above may also be used alone or in combination with the above algorithms to determine DOA.

In some embodiments, DOA estimation subsystem 340 may determine the DOA with respect to an absolute position of audio system 300 within the local area. The position of sensor array 320 may be received from an external system, such as some other components of an HMD, an artificial reality console, a mapping server, a position sensor (e.g., position sensor 190), and the like. The external system may create a virtual model of the local area, in which the local area and the position of audio system 300 may be mapped. The received position information may include a location and/or an orientation of some or all components of audio system 300 (e.g., sensor array 320). DOA estimation subsystem 340 may update the estimated DOA based on the received position information. As described above, other components of the HMD, such as cameras and/or position sensor, may also be used alone or in combination with DOA estimation subsystem 340 to determine the direction of the sound source or improve the accuracy of the direction of the sound source determined by DOA estimation subsystem 340.

Transfer function subsystem 350 may be configured to generate one or more acoustic transfer functions. A transfer function may include a mathematical function giving a corresponding output value for each possible input value. Based on parameters of the detected sounds, transfer function subsystem 350 may generate one or more acoustic transfer functions associated with the audio system. The acoustic transfer functions may include, for example, array transfer functions (ATFs), head-related transfer functions (HRTFs), other types of acoustic transfer functions, or any combination thereof.

An ATF may be used to characterize how the microphone receives a sound from a point in space. An ATF may include a number of transfer functions that characterize a relationship between the sound source and the corresponding sound received by the acoustic sensors in sensor array 320. Accordingly, for a sound source, there may be a corresponding transfer function for each acoustic sensor in sensor array 320, and collectively the set of transfer functions for the acoustic sensors in sensor array 320 may be referred to as an ATF for the sound source. The sound source may include, for example, someone or something generating sounds in the local area, the user, or one or more transducers of transducer array 310. The ATF for a particular sound source location relative to sensor array 320 may differ from user to user due to a person's anatomy (e.g., sizes and shapes of the ears, head, body, etc.) that can affect the sound as it travels to the person's ears. Accordingly, the ATFs of sensor array 320 may be personalized transfer functions for each user of the audio system 300.

In some embodiments, transfer function subsystem 350 may determine one or more HRTFs for a user of audio system 300. An HRTF characterizes how an ear receives a sound from a sound source in space. The HRTF for a particular source location relative to a person may be unique to each ear of the person (and is unique to the person) due to the person's unique anatomy (e.g., sizes and shapes of the ears, head, and body, etc.) that may affect the sound as it travels to the person's ears. In some embodiments, transfer function subsystem 350 may determine HRTFs for the user using a calibration process. In some embodiments, transfer function subsystem 350 may provide information about the user to a remote system. The user may adjust privacy settings to allow or prevent transfer function subsystem 350 from providing the information about the user to any remote systems. The remote system may determine a set of HRTFs that are customized for the user using, for example, machine learning or other techniques, and provide the customized set of HRTFs to audio system 300. More details of HRTF determination using audio controller 330 or another processing unit (e.g., a computer or a remote server) are described below.

Tracking subsystem 360 may be configured to track locations of one or more sound sources. For example, tracking subsystem 360 may compare current DOA estimates with stored historic DOA estimates, to determine if and how much a sound source has moved with respect to the user within a certain period of time, based on a change in the DOA estimate for the sound source during the period of time. In some embodiments, audio system 300 may recalculate DOA estimates on a periodic schedule, such as once per second or once per 100 milliseconds. In some embodiments, tracking subsystem 360 may additionally or alternatively detect a change in location based on visual information received from the HMD or some other external sources, such as one or more cameras or other image sensors. Tracking subsystem 360 may track the movement of one or more sound sources over time, and may store values for a number of sound sources and a location of each sound source at each point in time. In response to a change in a value of the location of a sound source, tracking subsystem 360 may determine that a sound source has moved. In some embodiments, tracking subsystem 360 may calculate an estimate of the localization variance. The localization variance may be used as a confidence level for each determination of a change in movement. Results of tracking the one or more sound sources may be used to determine if a sound source was moving during a time period when a sound signal was captured, and thus whether the captured sound signal may be suitable for use to determine a transfer function (e.g., an ATF or HRTF) by transfer function subsystem 350.

Beamforming subsystem 370 may be configured to analyze sounds detected by sensor array 320, and selectively emphasize (e.g., amplify) sounds from sound sources within a certain area (or from a certain direction) while de-emphasizing (e.g., attenuating) sounds from other areas (or other directions). In analyzing sounds detected by sensor array 320, beamforming subsystem 370 may combine information from different acoustic sensors to emphasize sound from a particular region (or direction) of the local area while deemphasizing sound that is from outside of the region (or direction). In one example, beamforming subsystem 370 may use this technique to determine a reference sound signal based on sound signals measured by two or more acoustic sensors of sensor array 320. In some embodiments, beamforming subsystem 370 may isolate an audio signal associated with sound from a particular sound source from audio signals associated with other sound sources in the local area based on, for example, different DOA estimates from DOA estimation subsystem 340 and tracking subsystem 360. Thus, beamforming subsystem 370 may selectively analyze discrete sound sources in the local area. In some embodiments, beamforming subsystem 370 may enhance a signal from a sound source. For example, beamforming subsystem 370 may apply sound filters which eliminate signals above, below, or between certain frequencies. Signal enhancement may be used to enhance sounds associated with a given identified sound source relative to other sounds detected by the sensor array 320.

Sound filter subsystem 380 may determine sound filters for generating audio data to drive transducer array 310. The sound filters may cause positive or negative amplification of sounds as a function of frequency. The audio content presented by the transducer array may be multi-channel spatialized audio. For example, the sound filters may cause the audio content to be spatialized, such that the audio content appears to originate from a particular direction and/or target region (e.g., an object in the local area and/or a virtual object in a target location). Sound filter subsystem 380 may use HRTFs and/or acoustic parameters to implement the sound filters. The acoustic parameters may describe acoustic properties of the local area, and may include, for example, a reverberation time, a reverberation level, a room impulse response, and the like. In some embodiments, sound filter subsystem 380 may calculate one or more of the acoustic parameters. In some embodiments, sound filter subsystem 380 may request the acoustic parameters from a mapping server (e.g., as described below with regard to FIG. 12).

In some embodiments, sound filter subsystem 380 may select and configure an audio TLDR from a set of possible audio TLDRs based on received input parameters. The received input parameters may include, for example, a target sound source angle, a target fidelity of audio rendering, target power consumption, target compute load, target memory footprint, a target level of accuracy in approximating a given HRTF, and the like. The selected and configured audio TLDR may be used for generating spatialized audio content in multiple channels from an input single channel audio signal. The input single channel audio signal (also referred to as mono-audio signal, monaural audio signal, monophonic audio signal, etc.) is audio content that arrives at a single channel and may be heard as sound emanating from a single position when provided to a speaker. The input single channel audio may be processed using the selected and configured audio TLDR to generate multiple channel audio signals, such as stereophonic audio content through two separate audio channels (e.g., a left channel and a right channel), and the like. The selected audio TLDR may be configured to use static audio filters, dynamic audio filters, and delays so that it approximates a given HRTF at a particular level of accuracy. Filtering the input single channel audio signal with the configured audio TLDR simulates the application of one or more HRTFs of a user of the audio system to the single channel audio signal, thereby generating multi-channel spatialized audio content. In some embodiments, sound filter subsystem 380 may request data in association with the filter parameter model from a parametric filter fitting system for HRTF rendering.

The principle of spatial hearing may be based on binaural and monaural cues. Binaural cues may be related to the differences between the sound signals received by two ears, including the time difference of arrival and the intensity difference between the sound signals received by two ears, which may be referred to as the interaural time difference (ITD) and the interaural level difference (ILD), respectively. These binaural cues may be related to perceiving the horizontal directions (azimuth localization) of a sound source. Monaural cues may include the direction-dependent spectral cues caused by the head, body, and pinna. Monaural cues may modify the magnitude spectrum of a sound source and may be strongly related to perceiving the vertical direction of a sound source, and thus may be used by the brain to estimate sound source elevation. Another monaural cue is the reverberant factor, which is defined as the amount of reflection and reverberation relative to the direct sound and may be related to perceiving the distance of a sound source. Although there is no simple relationship between the direction and sound localization cues, the human brain can use these cues to accurately estimate the location of a sound source in space. To simulate an acoustic scene with sound sources in different directions, audio contents from sound sources would need to be modified according to their directions. In binaural audio, such simulations may be implemented using direction-dependent acoustic filters, which may be referred to as head-related impulse responses (HRIRs) in the time domain, or as head-related transfer functions (HRTFs) in the frequency domain. An HRTF is a frequency response describing the modification (e.g., filtering) of a sound on its transmission path from the sound source to the ear canal. HRTFs can be measured in the form of linear time-invariant filters and synthesized by various models for real-time applications.

Figures 4A, 4B:
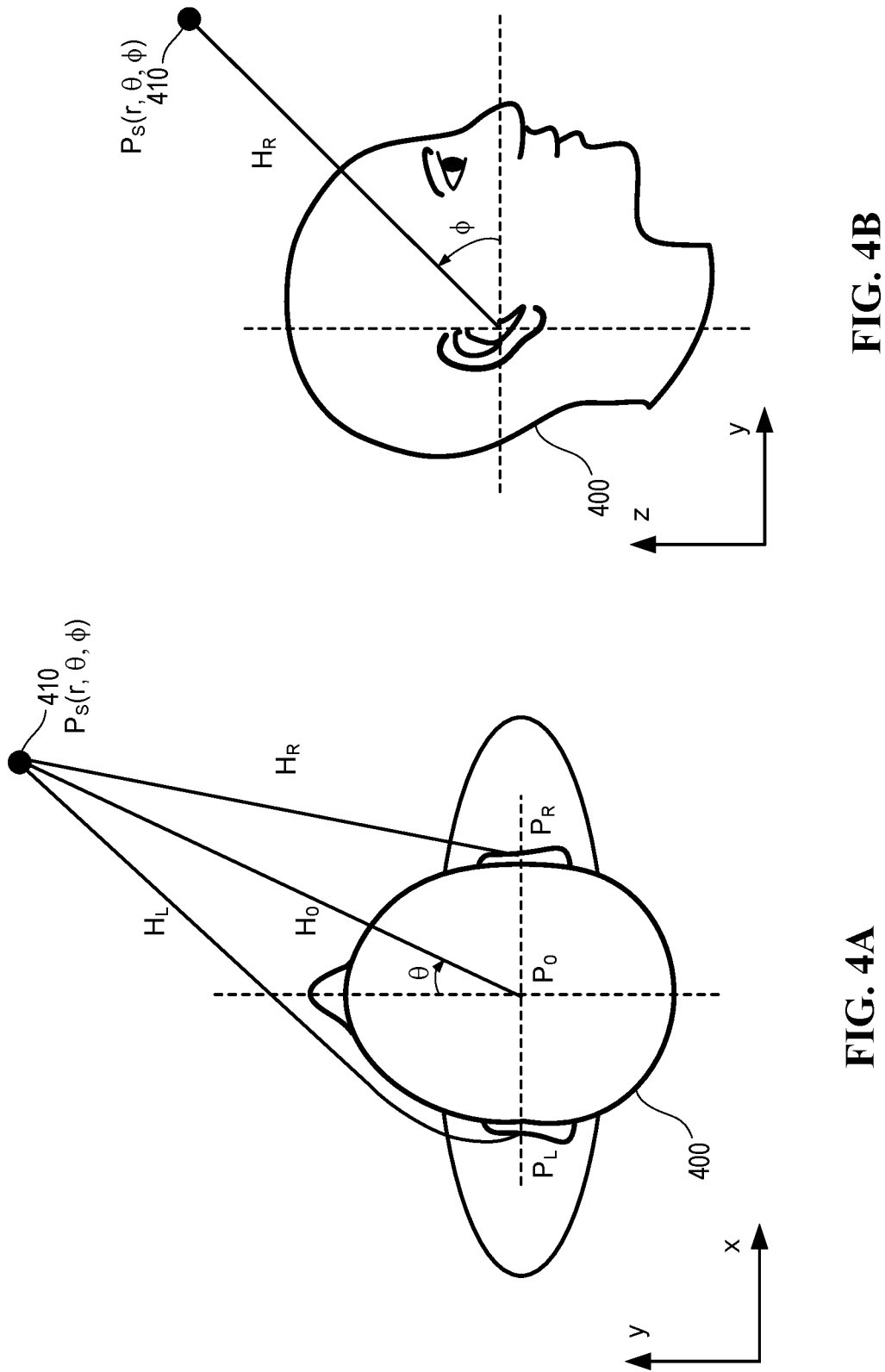
FIGS. 4A and 4B show spatial coordinates of a sound source with respect to the center of a user's head.

FIGS. 4A and 4B show spatial coordinates of a sound source with respect to the center of a user's head for describing HRTFs. FIGS. 4A and 4B show the spherical coordinate system and head transverse planes for specifying the location of a sound source. In FIGS. 4A and 4B, the origin of the coordinate system is at the center of the head 400 of the user, between the entrances to the two ear canals. From the origin, the x, y, and z-axes point to the right ear, front, and top of the head, respectively. The horizontal, median, and lateral planes may be defined by these three axes. The position of a sound source 410 is defined in the spherical coordinate system as $(r, \theta, \phi)$, where r is the distance from sound source 410 to the origin. $\theta$ is the azimuth angle between the y-axis and the horizontal projection of the position vector of sound source 410, defined as $-180° < \theta \leq +180°$, where $-90°$, $0°$, $+90°$, and $+180°$ indicate the left, front, right, and backward directions, respectively, on the horizontal (e.g., x-y) plane. $\phi$ is the elevation angle between the horizontal plane and the position vector of sound source 410, defined as $-90° \leq \phi \leq +90°$, where $-90°$, $0°$, and $+90°$ represent the bottom, front, and top directions, respectively, in the median (e.g., y-z) plane.

During transmission, the sound emitted from sound source 410 may be diffracted and reflected by the torso, head, pinna, and the like, before reaching both ears as shown in FIG. 4A. The sound pressure variations of a sound generated at sound source 410 may be represented by $P_S(r, \theta, \phi)$, the sound pressure variations at the entrance of the right ear may be represented by $P_R$, whereas the sound pressure variations at the entrance of the left ear may be represented by $P_L$. FIG. 4A also shows that the sound pressure variations at a location of the center of head 400 (e.g., in the absence of the user) may be represented by $P_0$. The transfer function from sound source 410 to the left ear of the user may be represented by $H_R$, which may be determined according to $H_R = P_R/P_S$. The transfer function from sound source 410 to the right ear of the user may be represented by $H_L$, which may be determined according to $H_L = P_L/P_S$. The transfer function from sound source 410 to the center of head 400 may be represented by $H_0$, which may be determined according to $H_0 = P_0/P_S$. An HRTF may be defined as an acoustic transfer function from the sound acquired at a center point (e.g., $P_0$) when a listener is absent to the sound acquired at the listener's ear (e.g., $P_L$ or $P_R$) in an anechoic field. HRTFs characterize a sound transmission process and account for the overall acoustic filtering effect by human anatomy.

FIG. 5A illustrates an example of measuring an HRTF for a user. A free-field HRTF may be calculated by dividing a binaural transfer function (e.g., $H_R$ or $H_L$) by an origin transfer function (e.g., $H_0$) for the head center position in the absence of the head to cancel out the influence of the measurement system characteristics. For each sound source direction, a pair of left and right HRTFs can be calculated by the complex division of the corresponding pair of binaural transfer functions by the origin transfer function. As shown in FIG. 5A, to determine the HRTF for a sound source direction, a microphone 520 may be positioned at the center of a user's head 500 with the subject absent. The output of a speaker 510 may be represented by $P_S(f)$, and the output of microphone 520 at the center of the user's head 500 may be represented by $P_0(f)$ in the frequency domain. Microphone 520 may then be positioned at an ear (e.g., right ear as shown in FIG. 5A) of the user, and the output of microphone 520 at the user's right ear may be represented by $P_R(f)$ in the frequency domain. The HRTF for the right ear for a sound source at the direction of speaker 510 may then be determined as $P_R(f)/P_0(f)$.

FIG. 5B illustrates an example of generating spatialized audio content based on the HRTFs for a user. In the example shown in FIG. 5B, an audio signal is provided as input to an audio controller 530. The input audio signal is processed by audio controller 530 to generate spatialized multi-channel audio signals for presentation to a user via a pair of speakers of a headset or IEDs. Audio controller 530 may include a set of left ear filters 532 for implementing the HRFT for the left ear, and a set of right ear filters 534 for implementing the HRFT for the right ear. As described above, the HRTFs may be different for sound sources from different directions. Therefore, the set of left ear filters 532 used to synthesize audio content from a sound source in a first direction may be different from the set of left ear filters 532 used to synthesize audio content from a sound source in a second direction. Similarly, the set of right ear filters 534 used to synthesize audio content from the sound source in the first direction may be different from the set of right ear filters 534 used to synthesize audio content from the sound source in the second direction. The set of left ear filters 532 and the set of right ear filters 534 for a sound source direction may be selected based on the sound source direction and/or the corresponding HRTFs for the left and right ears for the sound source direction. The output of the set of left ear filters 532 may be provided to a transducer in or on the left ear, whereas the output of the set of right ear filters 534 may be provided to a transducer in or on the right ear. The user may hear sounds using the left ear and the right ear, and perceive a sound that appears to be from the sound source direction.

As described above, HRTFs may depend on, for example, the size and shape of the user's outer ear (e.g., pinna), the size, shape, and density of the user's head and torso, the acoustic characteristics of the space in which the sound is played, the direction of the sound source, and so on. HRTFs are typically measured in an anechoic chamber (e.g., using a dummy) to minimize the influence of reflections and reverberation on the measured response. HRTFs may be measured at small increments in the azimuth angle and elevation angle, and interpolation may be used to synthesize HRTFs for arbitrary spatial positions. With the small increments, HRTFs for many (e.g., more than 100 such as a few hundred) spatial locations may need to be measured.

An HRTF measurement system may include, for example, a sound source (e.g., a loudspeaker) for generating stimuli, two in-ear microphones for recording binaural data, an audio interface for audio input and output, a head tracker for recording user orientation data, an optional display for visualizing the current and previously measured orientations, and a computing system for signal processing. The head tracker may provide three Euler angles (roll, pitch and yaw), where the yaw is the azimuth angle and the pitch is the elevation angle. The head tracker may provide head pose in the form of a quaternion. The sound source may be placed at a defined position relative to the user. An excitation signal may be provided by the computing system, processed by the audio interface (e.g., passing through a digital-to-analog converter (DAC) and a power amplifier), and reproduced by the loudspeaker. The sound signals reproduced by the loudspeaker may be captured by the in-ear microphones, amplified, digitized by an analog-to-digital converter (ADC) circuit, and delivered to the computing system. The measured sound signals and the excitation signal may then be used by the computing system to calculate the pair of HRTFs for the sound source position. HRTFs for other sound source positions may be determined in a similar manner.

Figure 6A:
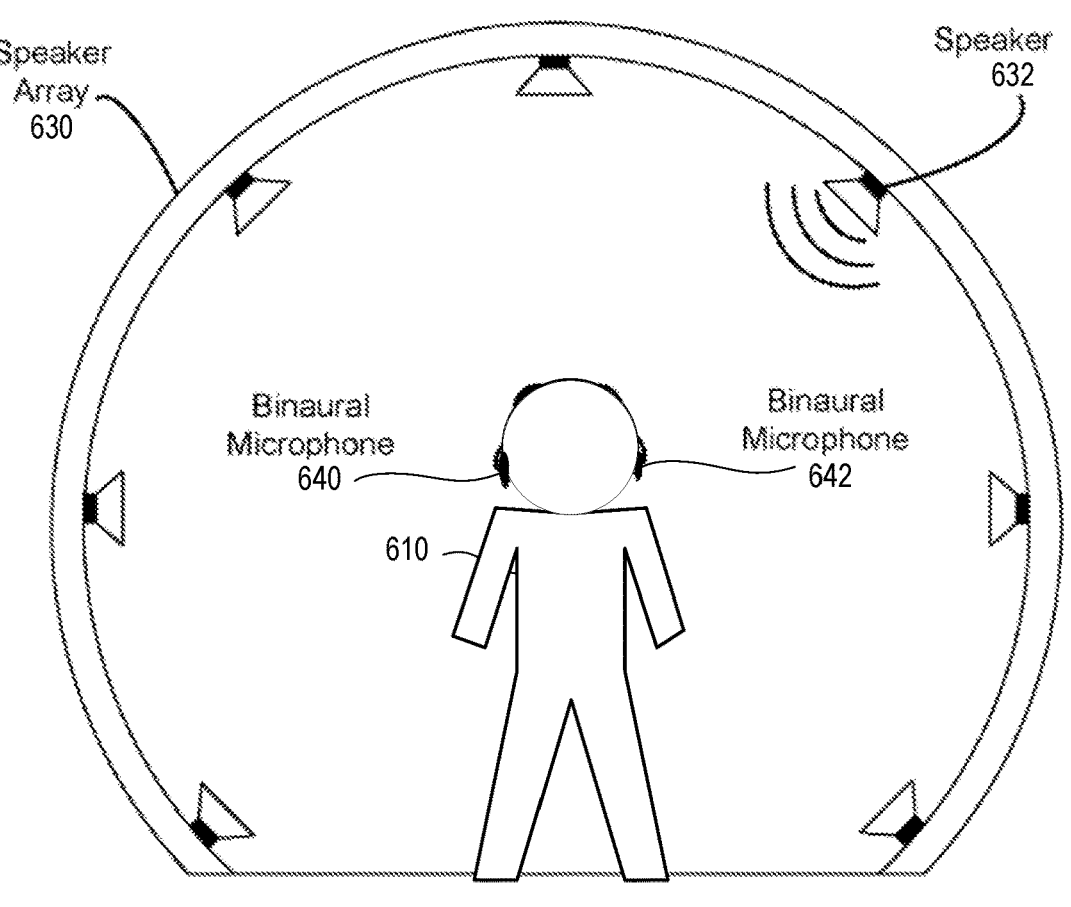
FIG. 6A illustrates an example of a system for measuring the HRTFs for a user.

FIG. 6A illustrates an example of a system for measuring the HRTFs for a user. The measurement system shown in FIG. 6A includes a speaker array 630 and a pair of binaural microphones 640 and 642 worn by a user 610. The measurement system may be housed in an acoustically treated chamber. In one example, the measurement system may be anechoic down to approximately 500 Hz. It may be useful to collect audio test data for a large number of people having different ages, different sizes, different genders, different hair lengths, and the like. In some examples, user 610 may be a manikin that may, for example, have physical features (e.g., the sizes and shapes of pinna, head, and torso, etc.) representative of an average person.

Speaker array 630 may generate test sounds in accordance with instructions from an audio controller of the measurement system. A test sound may be an audible signal that is suitable for determining an HRTF, or at least some parameters or a certain frequency band of an HRTF. A test sound may have one or more specified characteristics, such as frequency range, volume, and length of the transmission. The test sounds may include, for example, a continuous sinusoidal wave at a constant frequency, a chirped sound, some other audio content (e.g., music), or a combination thereof. A chirped signal is a signal whose frequency is swept upward or downward during a period of time. Speaker array 630 may include a plurality of speakers 632 that are positioned to project sound to a target area. The target area is where user 610 is located during the measurement. Each speaker of the plurality of speakers 632 may be in a different respective location or direction relative to user 610 in the target area. While speaker array 630 is depicted in two-dimensions in FIG. 6A, it is noted that speaker array 630 can also include speakers in other locations and/or dimensions (e.g., in a three-dimensional space). In one example, speakers 632 in speaker array 630 may be spaced apart by about 100 in elevation angle and about 10° in azimuth angle around a full sphere, creating a total of 612 (36×17) different spatial angles with respect to user 610. In some implementations, one or more speakers 632 of speaker array 630 may dynamically change their position (e.g., in azimuth angle and/or elevation angel) relative to the target area. In the above description, user 610 is stationary (e.g., the position of the ears within the target area stays substantially constant). In other implementations, user 610 may be on a rotatable stage that can position user 610 at different azimuth angles with respect to a speaker 632.

In the illustrated example, binaural microphone 640 is placed in the ear canal of the right ear of user 610, and binaural microphone 642 is placed in the ear canal of the left ear of the user. In some embodiments, binaural microphones 640 and 642 may be embedded in foam earplugs that are worn by user 610. Binaural microphones 640 and 642 may capture the test sounds emitted by speaker array 630. The captured test sounds may be referred to as audio test data. The audio test data can be used to determine a set of HRTFs. For example, test sounds emitted by a speaker 632 of speaker array 630 are captured by binaural microphones 640 and 642 as audio test data. The speaker 632 may have a specific location relative to the head of test user 610. Accordingly, a specific HRTF for each ear can be determined using the associated audio test data.

As described above, with the small increments, HRTFs for many (e.g., more than 100 such as a few hundred) spatial locations may need to be measured. Even with the small increments, interpolation can lead to front-back confusion, and can be difficult to optimize. In addition, HRTFs differ from person to person because the sound propagation varies due to the unique size and shape of the head, torso, and pinna of each person. Therefore, an HRTF that works well for one user may not work well for another user. Applying the HRTFs measured from a dummy or another person to a specific person can degrade the performance of immersive sound effects due to the variance in personal characteristics. Therefore, HRTFs may need to be individualized to obtain the desired localization performance. However, the process of creating personalized HRTFs based on measurements described with respect to, for example, FIG. 6A, can be time-consuming and computationally intensive, and is not scalable to a large number of users.

According to certain embodiments disclosed herein, a head-mounted device and in-ear devices (IEDs, which may or may not be a part of the head-mounted device) worn by a user may be used to determine personalized HRTFs or at least some parameters of personalized HRTFs for the user by, for example, capturing audio signals in the natural environment that are suitable for HRTF measurement, estimating the locations (e.g., directions) of the sound sources of the captured audio signals, and determining the HRTFs for the locations based on audio signals captured by the head-mounted device and the in-ear devices. As such, the head-mounted device and in-ear devices can listen to incidental sounds opportunistically in the user's natural environment with minimum or no user involvement to gradually add data points associated with different spatial locations to a data point cloud of the user's personalized HRTFs, such that user-specific HRTFs across all desired source directions may be built over time. The head-mounted device and in-ear devices may be worn by the user for other purposes (e.g., AR/VR applications) over a period of time (e.g., days, weeks, or months) to accumulate the HRTFs or parameters of the HRTFs for different directions. In this way, the HRTFs or parameters of the HRTFs for the user may be determined with minimum or no user involvement, and without using a specialized measurement system, such as a sound dampening chamber and an array of speakers. In some implementations, when HRTFs for a sufficient number of directions have been collected, the HRTFs may be interpolated to generate a personalized HRTF for any arbitrary sound source direction for the user.

Each sound signal captured by the head-mounted device and the IEDs can have a short duration (e.g., a few seconds, a few hundred milliseconds, tens of milliseconds, or even less than a few milliseconds in the case of impulsive sounds such as clicks), and/or a frequency band that may be at least a fraction of the human hearing range (e.g., between about 20 Hz to 20 kHz). An HRTF for the entire human hearing range may be determined using a set of sound signals, where each sound signal may cover a different respective frequency range. In some implementations, the HRTF for a fraction of the human hearing range may be determined by averaging the results determined using multiple sound signals to improve the accuracy. In some embodiments where the different frequency bands of an HRTF may be implemented using different filters, the filters may be selected based on the HRTF for fractions of the human hearing range determined using different sound signals covering different fractions of the human hearing range. In some implementations, the HRTFs or the parameters of the HRTFs may be used to personalize a non-personalized HRTF, for example, by personalizing the interaural time difference (ITD) and the frequency scaling factor.

Figure 6B:
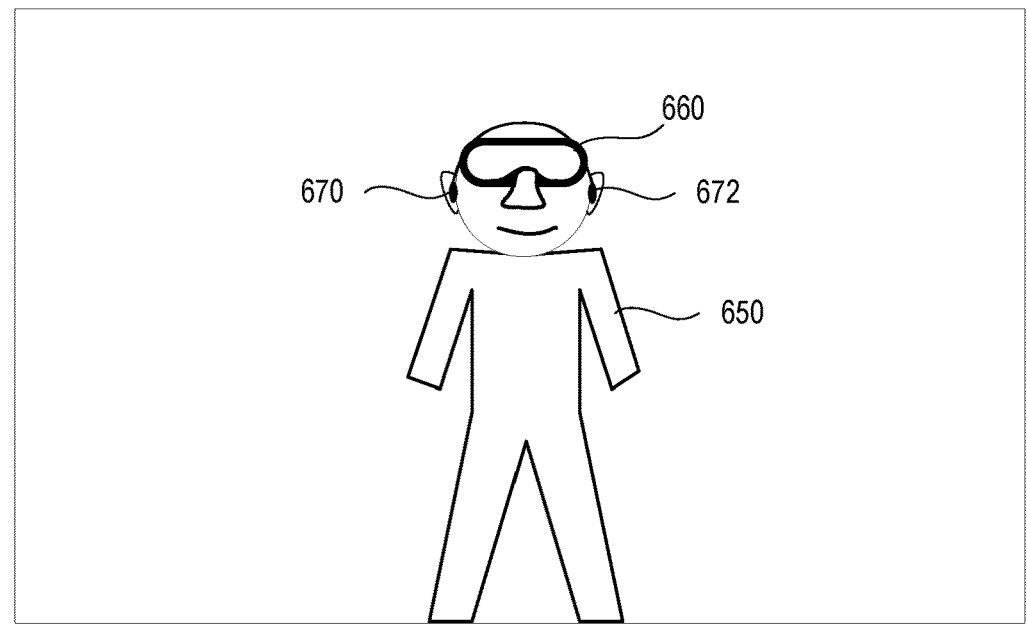
FIG. 6B illustrates an example of a system for determining personalized HRTFs or parameters of personalized HRTFs using techniques disclosed herein according certain embodiments.

FIG. 6B illustrates an example of a system for determining personalized HRTFs or parameters of personalized HRTFs using techniques disclosed herein according certain embodiments. As illustrated, in the system disclosed herein, a user 650 may be in the user's normal environment (e.g., living room, office, outdoor, etc.) and may wear a head-mounted device 660 and a pair of in-ear devices 670 and 672. Head-mounted device 660 may be an AR/VR system used by a user for AR/VR applications, such as NED 100 and HMD 200 described above. Head-mounted device 660 may include an audio system, such as audio system 300 described above with respect to FIG. 3. The audio system may include, for example, a microphone array and an audio controller. IEDs 670 and 672 may be part of head-mounted device 660, or may be separate from but in communication with head-mounted device 660.

In some implementations, head-mounted device 660 may include or may communicate with a camera system (e.g., a SLAM system) or another sensor that can be used to determine the location (e.g., direction) of an object that generates the sounds. The microphone array and/or the IEDs may be used to capture audio signals in the natural environment, and the captured audio signals may be analyzed by the audio controller to determine if they are suitable for HRTF measurement. For example, a sound that may be suitable for personalized HRTF measurement may have a high spatial stationarity (at least while the sound is being captured by head-mounted device 660 and in-ear devices 670 and 672, such as within about one second, within about a few hundred milliseconds, or within about tens of milliseconds), and may also have a high signal-to-noise ratio (SNR), a low reverberation level, a low reverberation time (e.g., low RT60), a broad frequency spectrum, and the like.

The direction or location of the sound source of a sound that is suitable for HRTF measurement may be determined based on, for example, the direction of arrival (DOA) determined using two or more microphones (e.g., in the microphone array of the head-mounted device), one or more cameras on or communicated with head-mounted device 660, or the like. In some implementations, the one or more camera, or one or more position sensors (e.g., inertial measurement units (IMUs) on head-mounted device 660 may be used to determine a relative position of the user's torso with respect to the user's head, because the HRTF may be affected by the relative position of the user's torso with respect to the user's head.

The audio signals captured by the microphone array may be used to determine an approximately anechoic reference signal (e.g., by beamforming in the estimated direction of the sound source to determine a reference sound signal) for use in determining the head-related transfer function. The audio signals captured by the IEDs may be used to determine the HRTF or parameters of the HRTF for the sound source direction (and the relative position of the user's torso with respect to the user's head) by dividing the audio signals captured by the IEDs using the reference signal determined based on the audio signals captured by the microphone array.

The IEDs may include an IED 670 for the right ear and another IED 672 for the left ear, and may be configured to be worn in the respective ear canals of the user, such that the IEDs may be configured to detect sound that reaches the user's ear canals from the local area. Each IED may include an outward facing (e.g., towards local area) microphone for capturing sound signals reaching the user's ear canal. The captured sound signals can be used to determine HRTFs for the user. In some examples, each IED may include an inward facing speaker (e.g., towards the ear drum), such that the IEDs may present audio content to the user during normal use of the IEDs (e.g., while the user uses an AR/VR application). In some embodiments, the IEDs may include other components, such as a transmitter, a receiver, a power supply, and one or more processors. For example, the IEDs may be connected to head-mounted device 660 or another device (e.g., a console or a portable device) wirelessly or using a wire, for transmitting data between the IEDs and head-mounted device 660 (or another device).

Head-mounted device 660 may be implemented as, for example, an eyewear device, such as smart glasses. In other embodiments, head-mounted device 660 may be implemented as a head-mounted display, such as HMD 200 described above. In some embodiments, the eyewear device is a near-eye display (NED), such as NED 100 described above. In some embodiments, head-mounted device 660 may be worn on the face of a user such that content (e.g., media content) may be presented to the user using a display assembly and/or an audio system. In some embodiments, head-mounted device 660 may be another device that may be worn on the head of the user. Examples of media content presented by head-mounted device 660 include images, videos, audios, or a combination thereof. Head-mounted device 660 may include a frame, and may include, among other components, a display assembly including one or more display elements, a depth camera assembly (DCA), an audio system, and one or more position sensors, as described above with respect to, for example, FIG. 1.

The DCA for determining the depth information of a local area surrounding head-mounted device 660 can be used to determine a location or direction of a sound source for determining HRTFs for the sound source location or direction. The DCA may include one or more imaging devices and a DCA controller, and may optionally include an illuminator. In some embodiments, the illuminator illuminates a portion of the local area with light. The one or more imaging devices may capture images of the portion of the local area. The DCA controller may compute depth information for the portion of the local area using the captured images and one or more depth determination techniques. The depth determination technique may include, for example, direct time-of-flight (ToF) depth sensing, indirect ToF depth sensing, structured light, passive stereo analysis, active stereo analysis (uses texture added to the scene by light from the illuminator), another technique to determine depth of a scene, or a combination thereof.

The position sensors (e.g., position sensors 190) on head-mounted device 660 may be used to generate one or more measurement signals in response to motion of the user's head. The measurement signals may be used to determine, for example, a relative position of the user's torso with respect to the user's head. The position sensor may be located on a portion of the frame of the headset. The position sensor may include an inertial measurement unit (IMU). Examples of position sensor include one or more accelerometers, one or more gyroscopes, one or more magnetometers, another suitable type of sensor that detects motion, a type of sensor used for error correction of the IMU, or a combination thereof.

In some embodiments, head-mounted device 660 may be provided with simultaneous localization and mapping (SLAM) function for tracking a position of head-mounted device 660 and updating a map of the local environment. For example, head-mounted device 660 may include a passive camera assembly (PCA) that generates color image data. The PCA may include one or more RGB cameras that capture images of some or all of the local area. In some embodiments, some or all of the imaging devices of the DCA may also function as the PCA. The images captured by the PCA and the depth information determined by the DCA may be used to determine parameters of the local area, generate a model of the local area, update a model of the local area, determine a location of the user, or a combination thereof. For example, the images captured by the PCA and the depth information determined by the DCA may be used to determine the location or direction of a sound source with respect to the user.

The audio system (e.g., audio system 300) of head-mounted device 660 may include a transducer array (e.g., transducer array 310), a sensor array (e.g., sensor array 320), and an audio controller (e.g., audio controller 330). The transducer array may be used to present sound to user. The sensor array may be used to detect sounds that may be suitable for HRTF determination, and may be used to determine a direction of a sound source and/or a reference source signal (e.g., by beamforming a sound signal that may be detected at the center location of the head) for HRTF determination. The sensor array may include a plurality of acoustic sensors that detect sounds within the local area of head-mounted device 660. Each acoustic sensor may be configured to detect sounds and convert the detected sounds into an electronic format (analog or digital). The acoustic sensors may include, for example, acoustic wave sensors, microphones, sound transducers, or similar sensors that are suitable for detecting sounds. The number and/or locations of acoustic sensors may be determined in order to optimize the amount of audio information collected and the sensitivity and/or accuracy of the information. The acoustic sensors may be oriented such that they are able to detect sounds in a wide range of directions surrounding the user of head-mounted device 660.

The audio controller may process data from the sensor array that describes sounds detected by the sensor array, and data from the IEDs that describes the sounds at the ear canals of the user. The audio controller may include a processor and a computer-readable storage medium. The audio controller may use the received data to generate direction of arrival (DOA) estimates, generate acoustic transfer functions (e.g., ATFs and/or HRTFs), track the location of sound sources, form beams in the directions of sound sources, classify sound sources, generate sound filters for the speakers, and the like, or a combination thereof.

For example, the audio controller may be configured to determine whether the sound detected by the sensor array have characteristics within a predetermined range, such that the sound may be suitable for HRTF determination. The characteristics may include, for example, reverberation characteristics, bandwidth characteristics, spatial stationary, and the like. In one example, the audio system may measure an amount of reverberation present in a scene and spectral-temporal characteristics of the sound detected by the sensor array (e.g., every 10-300 ms). If a sound is broadband without significant temporal modulations or reverberation, the audio controller may determine that the characteristics are within the predetermined range and may be suitable for HRTF determination. If the characteristics are determined to be outside of the predetermined range and thus the sound may not be suitable for HRTF determination, the audio controller may continue to monitor sounds detected by the sensor array. The audio system may also determine if the sound source is spatially stationary in the time period during which the sound is recorded, and may use the recorded sound for HRTF determination if the sound source is spatially stationary or may continue to monitor sounds detected by the sensor array if the sound source is not spatially stationary in the time period during which the sound is recorded.

If the sound detected by the sensor array have reverberation characteristics and spectral characteristics within the predetermined range and the sound source is stationary in the time period during which the sound is recorded, the audio controller may determine a relative location of the sound source with respect to head-mounted device 660, and optionally a confidence value associated with the determined location. The audio controller may use, for example, DOA techniques, images from the DCA and/or PCA, information from a position sensor, or a combination thereof, to determine the relative location of the sound source. The relative location may also account for a position of the torso relative to the head of the user. The audio controller may determine the confidence value for the determined location based in part on, for example, a difference between a position determined via DOA and a position determined from images and/or information from the position sensor.

If the confidence value meets a threshold value, the audio controller may determine one or more HRTFs (e.g., one for the right ear and one for the left ear) that are associated with the determined relative location of the sound source using the sounds detected by the IEDs. Sounds detected concurrently by the sensor array may be used to determine a reference transfer function or a reference sound signal for determining the HRTFs. For example, the microphones on head-mounted device 660 used for DOA and other applications may be used to beamform to the determined location using information from different acoustic sensors, to emphasize sound from a particular direction while deemphasizing sound from other directions as described above with respect to beamforming subsystem 370. In one example, the audio controller may determine an approximately anechoic sound signal, based on sound signals measured by two or more acoustic sensor of the sensor array. The beamformed signal may be used as a reference signal, while the signals detected by the IEDs may be used as the measurement signals, to determine the HRTFs by, for example, dividing the measurement signals by the reference signal in the frequency domain or the time domain. In some examples, the sound signals may only be suitable for determine HRTFs or HRTF parameters for a certain frequency band (e.g., a portion of a complete HRTF in the human hearing frequency range). In some examples, the sound signals may be used to determine some parameters of the HRTFs in a lower-dimensional parameter space, such as parameters of individual filters (e.g., notch filters, bandpass filters, high-shelf filters, and/or low-shelf filters) or parameters for modifying a non-individualized HRTF in order to generate a personalized HRTF, such as frequency scaling factors, personalized interaural time differences (ITDs), and the like. For example, HRTFs may be represented by a small set of spatial principal components combined with frequency and individual-dependent weights. In one example, an HRTF may be a linear combination of some basic spectral shapes (or base functions).

The determined HRTFs, portions of HRTFs, or some parameters associated with the HRTFs for the determined sound source direction may be saved to a data store that stores a set of HRTFs for various sound source directions. The audio controller may continue to detect sounds in the user's local environment to determine sounds that may be suitable for HRTF determination, and may then determine the HRTFs, portions of HRTFs, or some parameters associated with the HRTFs for various sound source directions using the detected sounds as described above. In some implementations, the HRTFs, portions of HRTFs, or parameters of the HRTFs may be appended, averaged, weighted averaged (e.g., based on the confidence level), or otherwise combined to generate more accurate and complete HRTFs. Over a sufficiently long period of time, such as days or weeks, personalized HRTFs or parameters associated with the personalized HRTFs for desired sound source directions or desired resolution (e.g., with less than 10° or 5° separation in elevation angle, and less than 10° or 5° separation in azimuth angle) may be accumulated. The HRTFs or parameters of the HRTFs for other sound source directions may be determined using linear or nonlinear interpolation to achieve a higher spatial resolution. In some implementations, as the HRTFs are accumulated, they may be projected into a low-dimension HRTF parameter space (e.g., coefficients for a cascade of biquad filters such as infinite impulse response (IIR) filters), thereby enabling spatial interpolation. In this manner, over time, a complete set of HRTFs that are customized to the user may be generated.

Based on the set of HRTFs or parameters of the HRTFs, the audio controller may implement appropriate HRTFs for a target sound source direction to synthesize audio content for the target sound source, and provide the synthesized audio content to the transducer array and/or the IEDs to present spatialized audio content to the user. In some embodiments, lower-dimensional parameters of the HRTFs and the corresponding sound source direction may be saved in a model or look-up tables, such that the lower-dimensional parameters for implementing the HRTFs for a sound source direction may be retrieved using the sound source direction and the model or look-up tables. For example, in some implementations, the audio controller or another processing unit may generate a model and/or look-up tables that map ITDs and filter parameters for approximating the true HRTFs for various target positions (azimuth and/or elevation angles). In some implementations, the audio controller or another processing unit may generate a model and/or look-up tables that map personalized ITDs and personalized frequency scaling factors for personalizing non-personalized HRTFs for various target positions (azimuth and/or elevation angles). The model and/or the look-up tables may then be used to retrieve the parameters for implementing the HRTFs for a target sound source direction based on the target sound source direction.

FIG. 7 includes a flowchart 700 illustrating an example of a process of determining personalized HRTFs for a user using a head-mounted device and in-ear devices, according to certain embodiments. Operations in flowchart 700 may be performed using, for example, an audio controller, a head-mounted device, a wearable device, a personal electronic device, a server or another computing system, or a combination thereof. Although flowchart 1400 may describe the operations as a sequential order, some of the operations may be performed in parallel or concurrently. In addition, the order of the operations may be rearranged. The process may have additional steps not included in the flowchart. Some operations may be optional or may be omitted in some implementations. Some operations may be performed more than one time.

Operations at block 710 of flowchart 700 may include receiving a first sound signal associated with a sound from a sound source in a local area of a user. The user may wear a head-mounted device, such as NED 100, HMD 200, or head-mounted device 660. The user may also wear in-ear devices (e.g., IEDs 670 and 672) that include outward facing microphones. The sound source may be at a certain direction with respect to the user. Each sound may last, for example, tens of milliseconds, a few hundred milliseconds, a few seconds, or longer. The first sound signal may be detected by, for example, a sensor array of an audio system of the head-mounted device, such as the plurality of acoustic sensors 180 or sensor array 320. In one example, the sensor array may include two or more acoustic sensors on the frame (e.g., temples) of a pair of glasses and may detect sounds in the user's local area. In some implementations, the first sound signal associated with the sound from a sound source may be detected by other acoustic sensors in a device worn or carried by the user. The microphones of the IEDs may also detect the sound from the sound source in the local area of the user.

Operations at block 720 may include determining, based at least on the first sound signal, that spectral characteristics of the sound meet predetermined criteria. A sound that may be suitable for personalized HRTF determination may have a high signal-to-noise ratio (SNR), a low reverberation level, a low reverberation time (e.g., low RT60), a broad frequency spectrum, and the like. Thus, the criteria may include, for example, an SNR greater than a threshold value, a reverberation level lower than a threshold level, a reverberation time (e.g., RT60) shorter than a threshold length, a frequency greater than a certain threshold frequency (e.g., a few kHz), a frequency band wider than a threshold range, or a combination thereof. The first sound signal may be analyzed, for example, by the audio controller, to determine the SNR, reverberation level, reverberation time (e.g., RT60), frequency band, and the like, to determine if the first sound signal meet the criteria. If it is determined that the first sound signal meets the criteria, the first sound signal may be suitable for HRTF determination.

Operations at block 730 may include determining that the sound source is stationary within a time period when the first sound signal is captured. A sound that may be suitable for personalized HRTF determination may also have a high spatial stationarity (at least while the sound is being captured by the head-mounted device and in-ear devices, such as within a few seconds, within a second, within a few hundred milliseconds, or within tens of milliseconds). The spatial stationary of the sound source may be determined based on, for example, the location of the sound source tracked by the audio controller, the position of the sound source tracked by the SLAM of the head-mounted device, the position of the sound source tracked using the DCA, PCA, or images captured by one or more cameras or other image sensors, or a combination thereof. If it is determined by the audio controller or another processor that the sound source is stationary within a time period when the first sound signal is captured, the first sound signal may be suitable for HRTF determination.

Operations at block 740 may include estimating a relative location of the sound source with respect to the user. For example, the audio controller of the head-mounted device may use sound signals captured by two or more acoustic sensors of the sensor array to estimate the direction of arrival of the sound based on, for example, the difference in the time of arrival at different acoustic sensors. In some implementations, alternatively or additionally, the relative location of the sound source with respect to the user may be determined based on, for example, the position of the sound source determined by the SLAM of the head-mounted device, the position of the sound source determined using images captured by one or more cameras or other image sensors, or a combination thereof. The relative location of the sound source with respect to the user may be described using, for example, an azimuth angle of the sound source, an elevation angle of the sound source, or a combination thereof with respect to the user. In some implementations, a confidence level of the estimated direction of the sound source may be determined as described above with respect to, for example, FIG. 6B. In some implementations, a relative position of the torso of the user with respect to the head of the user may be determined based on data from one or more position sensors of the head-mounted device.

Operations at block 750 may include, receiving, from an in-ear device in an ear of the user, a second sound signal associated with the sound from the sound source. For example, the acoustic sensor (e.g., microphone) on the IED device in each ear may sense the sound pressure variations at the entrance of the ear to generate a sound signal associated with the sound from the sound source. The IED device and the sensor array may concurrently capture sound signals associated with the sound from the sound source to generate the first sound signal and the second sound signal.

Operations at block 760 may include determining based on the first sound signal and the second sound signal, an HRTF or one or more parameters of the HRTF associated with the relative location of sound source for the user. For example, the first sound signal may be used to determine a reference sound signal, and the reference sound signal may then be used as the reference to determine the HRTFs or parameters of the HRTFs. In one example, a frequency domain analysis (e.g., Fourier transform or z-transform) may be performed on the reference sound signal and the second sound signal to determine the spectrum of the reference sound signal and the spectrum of the second sound signal, and the HRTF may be determined by dividing the spectrum of the second sound signal using the spectrum of the reference sound signal. The reference sound signal may be, for example, a sound signal that may be received by an acoustic sensor positioned at the center of the head of the user, and may be determined based on the first sound signal measured by two or more acoustic sensor of the sensor array. In one example, the audio controller may use the first sound signal captured by the sensor array (e.g., microphones) and the determined sound source direction to beamform to the determined location using information from different acoustic sensors, such as emphasizing sound from a particular direction while deemphasizing sound from other directions, as described above with respect to beamforming subsystem 370. The beamformed signal may be used as a reference sound signal, while the signals detected by the IEDs may be used as the measurement signals, to determine the HRTFs (or HRIRs) by, for example, dividing the measurement signals by the reference signal in the frequency domain (or the time domain). The one or more parameters of the HRTF may include parameters in a lower-dimensional parameter space, such as parameters of one or more filters or parameter scaling factors for scaling parameters (e.g., frequency, gain, Q, or other parameters) of HRTFs for implementing personalized HRTFs. The HRTF or the one or more parameters of the HRTF and the relative location of the sound source (and the relative position of the torso with respect to the head) may be saved to a data store that stores a plurality of HRTFs for the user.

The operations in blocks 710-760 may be performed iteratively to capture sounds occurring in the user's local environment that are suitable for HRTF determination, and determine HRTFs or parameters of HRTFs for a plurality of different sound source directions to populate data points of the personalized HRTFs for the user, until the HRTFs or parameters of the HRTFs for all desired sound source directions are determined or until a spatial resolution of the data points is higher than a desired spatial resolution. In some implementations, a model or look-up table for mapping a relative location of the sound source to the corresponding HRFTs or corresponding one or more parameters of the HRTFs may be generated, and may be used to retrieve the corresponding one or more parameters for a target sound source direction.

As described above, in some examples, the captured sound signals may only be suitable for determine HRTFs for a certain frequency band (e.g., a portion of a HRTF for the full human hearing frequency range) or some HRTF parameters. In some examples, the captured sound signals may be used to determine some parameters of the HRTFs in a lower-dimensional parameter space, such as parameters of individual filters (e.g., notch filters, bandpass filters, high-shelf filters, and/or low-shelf filters), parameters of individual audio time and level difference renderers (TLDRs), or parameters for modifying a non-personalized HRTF to generate a personalized HRTF, such as frequency scaling factors, personalized interaural time differences (ITDs), and the like.

Figure 8:
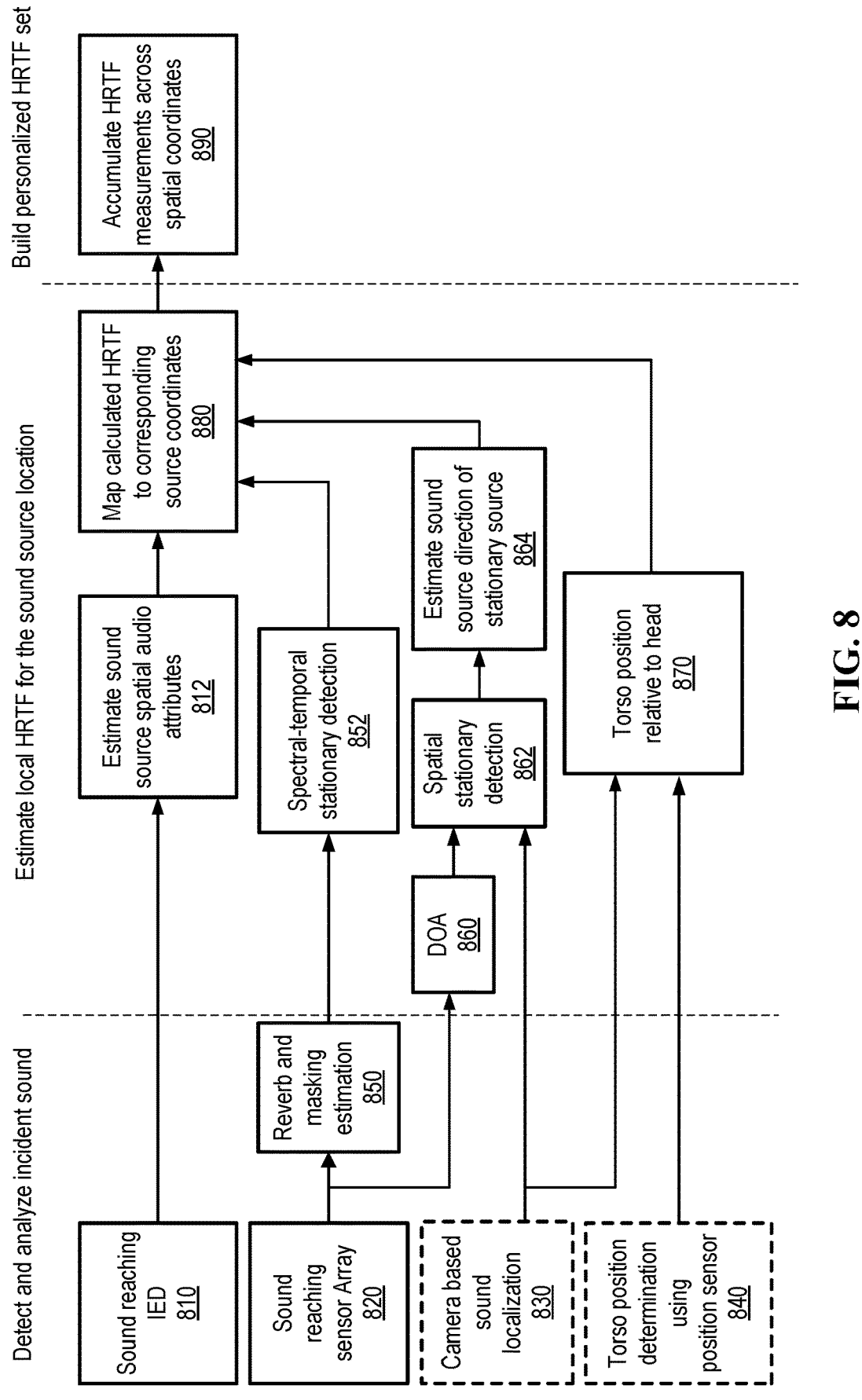
FIG. 8 illustrates an example of a process of building a personalized HRTF set for a user using a system that includes a head-mounted device and in-ear devices according to certain embodiments.

FIG. 8 illustrates an example of a process of building a personalized HRTF set for a user using a system that includes a head-mounted device and in-ear devices according to certain embodiments. In the illustrated example, the process may include three stages. In the first stage, incident sound from a sound source in the user's local environment may be detected and analyzed, and other information of the sound source and the user may also be collected. For example, incident sound reaching the in-ear device from the sound source may be detected by the microphone of the in-ear device at 810, and incident sound reaching the sensor array (e.g., microphones) on the head-mounted device from the sound source may be detected by the sensor array on the head-mounted device at 820. The incident sound detected by the sensor array may be analyzed for reverberation and masking estimation at 850 to determine the level and time of reverberation and whether the volume of the reflections is low enough so as not to mask the direct sound. If the reverberation level/time is low, the sound may be suitable for HRTF determination. In some implementations, one or more cameras of the head-mounted device may capture images of the user's local environment at 830 for sound source location determination. In some implementations, one or more position sensors may generate data for torso position determination at 840.

In the second stage, data collected by the IEDs, sensor array, camera, position sensor, and the like may be processed to estimate local HRTFs or parameters of local HRTFs for the sound source location. For example, the incident sound detected by the sensor array may be used for spectral-temporal stationary detection at 852 to determine whether the sound source is spectrally and temporally stationary. In one example, a bank of spectro-temporal filters may be applied to the input signal, the variance in the filter responses may be measured over a time period, and the signal may be determined to be stationary if the measured variance is low. Other methods of determining the amount of change of a sound's spectrum over time may also be used for the spectral-temporal stationary detection. As described above, in some examples, the audio controller may determine a reference sound signal (e.g., a sound signal that may be received by an acoustic sensor positioned at the center of the head of the user) based on the sound signals detected by the sensor array (e.g., by beamforming). The incident sound detected by the sensor array and/or the images captured by one or more cameras may be used to determine the direction of arrival of the incident sound at 860, to determine whether the sound source is spatially stationary at 862, and to estimate the sound source direction if the sound source is determined to be spatially stationary. In one example, the direction of arrival of the incident sound may be determined based on the different time of arrival of the incident sound arriving at different acoustic sensors with known positions. In another example, the direction of arrival of the sound source with respect to the user may be determined based on the different view angles of the sound source viewed by two or more cameras at known locations, or other camera based object localization techniques. In some examples, the relative position of the sound source may be tracked based on the incident sound detected by the sensor array and/or the images captured by one or more cameras to determine whether the sound source is spatially stationary. In some examples, the location or direction of the sound source with respect to the user may be determined based on both the incident sound detected by the sensor array and the images captured by one or more cameras. In some implementations, a confidence level may be determined for the determined sound source direction, based on the incident sound detected by the sensor array and/or the images captured by one or more cameras. As described above, the relative position of the user's torso with respect to the user's head may also affect the HRTFs. Therefore, the relative position of the user's torso with respect to the user's head may be determined, for example, using the sensor data generated by one or more position sensors. The audio controller may estimate audio attributes of the sound signals detected by the microphones on the in-ear devices at 812, estimate audio attributes of the reference sound signal, and determine the HRTFs or parameters of the HRTFs at 880 for the sound source direction and torso position as described above and below, such as with respect to block 760 of FIG. 7.

In the third stage, the determined HRTFs (or parameters of the HRTFs), the corresponding direction of the stationary sound source, and the corresponding relative position of the user's torso with respect to the user's head may be saved to a data store at 890. The system may continue to capture sounds in the user's local environment to detect sounds that may be suitable for HRTF determination, determine the directions of the sources of the sounds, determine the HRTFs (or parameters of HRTFs) for the corresponding sound source directions, and save the HRTFs (or parameters of HRTFs) for the corresponding sound source directions to the data store. In this way, over a period of time (e.g., days or weeks), a set of personalized HRTFs for desired sound source directions and/or with a spatial angle resolution higher than a certain threshold may be generated. As described above, in some embodiments, the HRTFs (or parameters of HRTFs) for a sound source direction may be determined using sound signals captured at different time, and/or may be further processed, such as appended, averaged, or weighted averaged, to determine the personalized HRTFs (or parameters of HRTFs) for the sound source direction. The set of personalized HRTFs may be used to estimate the HRTFs (or parameters of HRTFs) for other sound source directions, for example, by interpolation.

In some embodiments, the audio controller or another processing unit may utilize user responses to the synthetically generated sounds (e.g., explicitly indicating apparent directions of the sound sources in space, or implicitly reacting to the generated spatial audio) to adjust the parameters over time, to more closely model the HRTFs and provide a more realistic spatial perception to the user.

As described above, a set of personalized HRTFs may be a multi-valued function that is individualized to each user. An HRTF for a user may include redundant information/patterns. Furthermore, HRTFs of multiple users may have similar functional information across them. Therefore, it is possible to approximate the HRTF of multiple users by low-complexity signal processing using parameters in a lower-dimensional parameter space. For example, in some implementations, the lower-dimensional parameters of the HRTFs may be determined using the techniques disclosed herein and may include the ITD and lower-dimensional parameters of the HRTFs for a sound source direction, such as parameters of filters (e.g., the center frequency, gain, and Q values of the filters, or other parameters for defining the filters) for implementing the HRTFs. In some examples, the lower-dimensional parameters of the HRTFs determined using the techniques disclosed herein may include personalized ITDs and personalized frequency scaling factors for personalizing non-personalized HRTFs. In some implementations, to determine the parameters in the lower-dimensional parameter space for HRTF rendering, a set of parameters (e.g., filter parameters or frequency scaling factors) may be initialized and then optimized to match the measured HRTFs for a sound source direction. In some implementations, machine learning models such as neural networks may be trained to fit HRTFs with lower-space parameters (e.g., filter parameters or frequency scaling factors) in such a way that the parameters may vary smoothly across space and behave analogously across different users.

In some embodiments, the audio controller or another processing unit may generate a model and/or look-up tables that map ITDs and filter parameters for approximating the true HRTFs for various target positions (azimuth and/or elevation angles). For example, the lower-dimensional parameters (e.g., parameters of filters) and the corresponding sound source direction may be saved in the look-up tables, such that the parameters of the filters for implementing the HRTFs may be retrieved using the target sound source direction and the look-up tables. In some embodiments, the model and/or look-up tables may later be installed, downloaded, and the like, onto the audio system from an external server. In some embodiments, the model and/or look-up tables may be on the external server from which the audio system requests the filter parameters by providing the target sound source direction.

In some implementations, the HRTFs or parameters of the HRTFs determined using techniques disclosed herein may be used for selecting, configuring, and applying appropriate parameters to a time and level difference renderer (TLDR) for generating spatialized audio content, which may then be provided to a user through a head-mounted device (e.g., a headset) or in-ear devices. For example, the audio system may use information such as a target sound source direction and a target fidelity of audio rendering to select audio TLDR parameters from a set of possible audio TLDR parameters for generating multi-channel spatialized audio content from a mono-channel audio signal. The selected audio TLDR may use static audio filters, dynamic audio filters, delays, or a combination thereof, to simulate applying one or more head-related transfer functions (HRTFs) for a user to the audio signal and thereby generate multi-channel spatialized audio content from an input mono-channel audio signal. Subsequent to configuration, the audio TLDR may be applied to an audio signal received at a single channel to generate spatialized audio content corresponding to multiple channels (e.g., left and right channel audio signals).

In one example, the selected and configured audio TLDR may include a cascaded series of infinite impulse response (IIR) filters and a pair of delays. The selected and configured audio TLDR may have a set of configured monaural static filters (with 0, 1, 2, or more monaural static filters in the set) and a set of configured monaural dynamic filters (with 0, 1, 2, or more monaural dynamic filters in the set) connected to the set of monaural static filters. In some embodiments, the selected and configured audio TLDR may also include binaural static filters that may perform, for example, individualized left/right speaker equalization. In some embodiments, the selected and configured audio TLDR may also include a set of one or more configured binaural dynamic filters in each channel of multiple audio channels (such as a connected left channel and a connected right channel). In addition, in some embodiments, the selected and configured audio TLDR may have a configured delay between the multiple audio channels.

In some embodiments, selecting and configuring a particular audio TLDR involves selecting and configuring the filters in each of the sets of monaural static filters, monaural dynamic filters, binaural static filters, and binaural dynamic filters in the particular audio TLDR. The selection and configuration of the filters may be based on, for example, desired target power consumption of the audio TLDR, a target compute load specification in association with the selected audio TLDR, target memory footprint in association with the selected audio TLDR, a target sound source direction, target sound source distance, target audio fidelity of audio rendering, or a combination thereof. As described above, the target sound source direction describes the angular location of a virtual sound source relative to the user, and may be described by both an azimuth parameter value (e.g., azimuth angle) and an elevation parameter value (e.g., elevation angle).

There may be several advantages of using a parametric audio TLDR approach in generating spatialized audio content. One advantage is the efficiency in compute and memory, because the computational complexity in using the cascaded series of infinite impulse response (IIR) filters may be much lower than an equivalent impulse response convolution for implementing the HRTFs in the time domain (such as would occur with the use of finite impulse response filters), and may be one to two orders of magnitude smaller in memory usage. The reduced complexity of the approach makes embodiments described herein implementable even in hardware offering low computational and memory resources. Another advantage of the approach is that, by using IIR filters, the approximated HRTFs can be interpolated, individualized, and manipulated in real time. For example, moving a notch in a time-domain impulse response may be complicated, while, in a parametric framework, the center frequency of a filter may be easily adjusted (e.g., by modifying some parameters in a model, such as modifying values in a look-up table). This allows increased flexibility for individualizing HRTFs, adjusting, and correcting filter parameters for individual device equalization or hardware output curves. Another advantage of the parametric audio TLDR approach is that it offers scalability, trading off compute and memory footprint for desired accuracy. For example, in the audio TLDR approach, more or fewer filters may be applied to more or less closely approximate the HRTF since the number of filters used may affect the accuracy of audio rendering. By increasing the number of filters employed, the approach allows for modifying the rendering from device to device, or on the same device as needed. For example, when a device has more compute capability/battery, it can use an architecture that utilizes more filters to more closely approximate the HRTF. In the low battery mode or on a device with limited compute resources, the parametric audio TLDR approach may switch to an architecture using fewer filters to perform audio spatialization that is possible with the allocated filter resources. In some implementations, when taking room acoustics into consideration, direct sound may be spatialized at a highest resolution, while early reflection and late reverberation may be rendered at progressively lower detail or accuracy.

Figure 9:
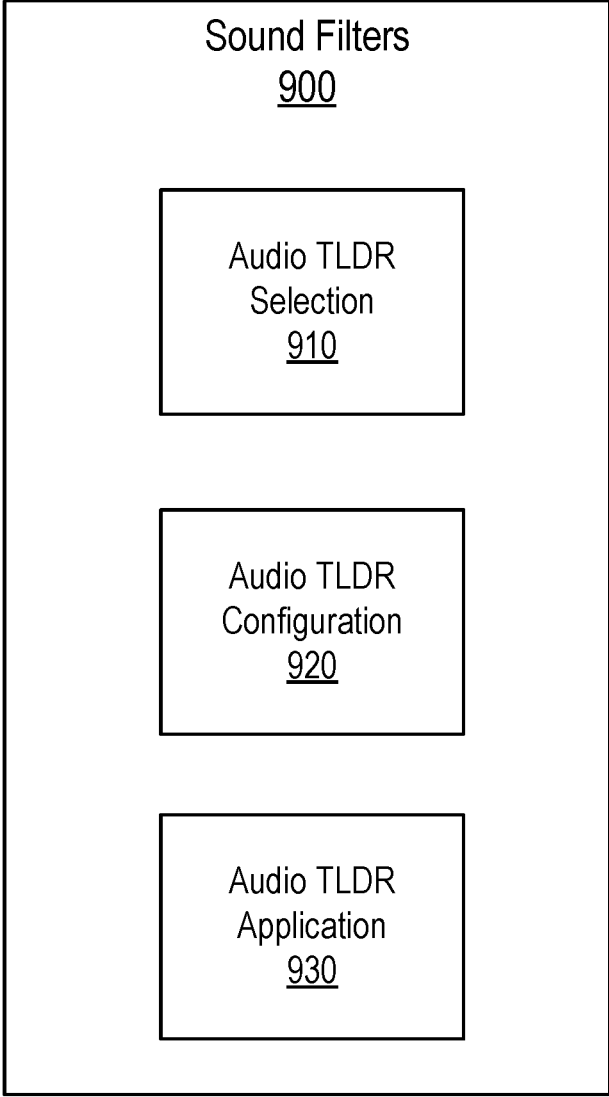
FIG. 9 is a block diagram of an example of a sound filter subsystem in the audio system of a head-mounted device, according to certain embodiments.

FIG. 9 is a block diagram of an example of a sound filter subsystem 900 in the audio system of a head-mounted device, according to certain embodiments. Sound filter subsystem 900 may be an embodiment of sound filter subsystem 380 described above with respect to FIG. 3. In the illustrated example, sound filter subsystem 900 includes an audio TLDR selection module 910, an audio TLDR configuration module 920, and an audio TLDR application module 930. In alternative configurations, sound filter subsystem 900 may include different and/or additional modules, and the functions of sound filter subsystem 900 can be distributed among the modules in different manners than the manner described herein.

Audio TLDR selection module 910 may select an audio TLDR from a set of possible audio TLDRs for generating multiple channel spatialized audio content from a single channel input audio signal. The set of possible audio TLDRs may include a range of audio TLDRs, from audio TLDRs with few configured filters to audio TLDRs with more configured filters. Audio TLDRs with few filters may have lower power consumption, lower compute load, and/or lower memory footprint requirements when compared to audio TLDRs with increasing numbers of cascaded static and dynamic filters that have correspondingly increasing power consumption, compute load, and/or memory footprint requirements. As the number of static and dynamic audio filters increases in an audio TLDR, there may be a corresponding improvement in its accuracy in approximating a magnitude spectrum of a given HRTF. For example, an audio TLDR with several configured dynamic binaural filters may be capable of being close to approximating a given HRTF. Thus, there is a trade-off in selecting an audio TLDR with additional filters since such an audio TLDR may lead to an improved approximation of a given HRTF when used in generating spatialized audio content, but may also result in a corresponding increase in power consumption, compute load, and memory requirements.

In some embodiments, the set of possible audio TLDRs may include three audio TLDRs that provide different levels of accuracy in approximating the magnitude spectrum of a given HRTF. In some embodiments, the set of possible audio TLDRs may include: (i) an audio TLDR that provides a first approximation of a given HRTF using two biquad filters and a delay, along with one-dimensional interpolating look-up tables for configuring the filters, (ii) a second audio TLDR that provides a second approximation of the given HRTF using six biquad filters, two gain adjust filters, and one-dimensional and two-dimensional interpolating look-up tables for configuring the filters, and (iii) a third audio TLDR that provides a third approximation of the given HRTF using twelve biquad filters, and one-dimensional and two-dimensional interpolating look-up tables for configuring the filters. In these embodiments, as the number of filters in the selected audio TLDR increases, the corresponding approximation of a given HRTF is closer to the given HRTF. Furthermore, each of the audio TLDRs in the set of audio TLDRs may be associated with a particular range of memory footprint, compute load, power consumption etc. In alternative embodiments, the audio TLDRs in the set may have different numbers of static and dynamic filters, including more or less than a pair of binaural biquad filters, and the like. In some embodiments, the filters in an audio TLDR may be coupled in a different manner than the manner described herein.

The selection of the particular audio TLDR from the set of possible audio TLDRs by audio TLDR selection module 910 may be based on certain input parameters. In some embodiments, the input parameters may include a target power consumption, target compute requirements, target memory footprint, a target level of accuracy in approximating a given HRTF, and the like, or a combination thereof. The input parameters may also specify a target fidelity of the audio content rendering as a target frequency response, a target signal to noise ratio, and the like, for the rendered audio content. In some embodiments, a weighted combination of the received input parameters may be used in selecting the audio TLDR. In some embodiments, audio TLDR selection module 910 may obtain default values for these parameters from data store 335 and use the default values in selecting the audio TLDR. For a given input parameters (e.g., a target memory footprint and a target compute load), audio TLDR selection module 910 may select a particular audio TLDR from the set of possible audio TLDRs using a selection model retrieved from data store 335. The selection model may be in the form of a look-up table that maps ranges of input parameter values to the audio TLDRs in the set of possible audio TLDRs. In some embodiments, the selection model may map a specific weighted combination of the input parameter values to one of the audio TLDRs. Other selection models may also be possible. In some embodiments, audio TLDR selection module 910 may receive input parameters in the form of a specification of a target level of accuracy in approximating a given HRTF. In these embodiments, audio TLDR selection module 910 may select an audio TLDR from the set of audio TLDRs based on a model. The model may be in the form of, for example, a look-up table, that maps specific audio TLDRs in the set to achieving particular levels of accuracy in approximating a given HRTF. In such embodiments, the target level of accuracy of approximation of the given HRTF may be specified as an input parameter using a virtual and/or physical input mechanism (e.g., dial) that may be tuned to specify the target approximation accuracy level.

Audio TLDR configuration module 920 may configure the various filters of a selected audio TLDR to provide an approximation of a given HRTF. In some embodiments, audio TLDR configuration module 920 may retrieve one or more models from data store 335 for use in configuring the various filters of the selected audio TLDR. Audio TLDR configuration module 920 may receive and use input parameters such as a target sound source direction along with the retrieved models to configure the filters of the selected audio TLDR. As described above, the HRTFs may be different for different sound source direction. Audio TLDR configuration module 920 may configure the filters to approximate the corresponding HRTFs for the target sound source direction, so that the configured audio TLDR may subsequently receive and process a single channel audio signal to generate spatialized audio content corresponding to multiple channel audio signals (e.g., left and right channel audio signals) for presentation to a user.

In some embodiments, audio TLDR configuration module 920 may configure the selected audio TLDR as a cascaded series of infinite impulse response (IIR) filters and fractional or non-fractional delays to generate the spatialized audio content corresponding to multiple channel audio signals (e.g., left and right channel audio signals) from the input single channel audio signal. In some embodiments, the cascaded series of IIR filters may include biquad filters, which may be third order recursive linear filters having two poles and two zeros. Biquad filters used in embodiments herein may include "high-shelf" and "peak/notch" filters. Parameters of these biquad filters may be specified using filter type (high-shelf vs peak/notch), and central frequency/gain/Q triplet parameter values (or frequency band, gain/ attenuation, and slope). The cascaded series of IIR filters may include one or more single channel (i.e., monaural) static filters, monaural dynamic filters, as well as multiple channel (i.e., binaural) dynamic filters.

Audio TLDR configuration module 920 may configure fixed (i.e., unchanging with respect to target sound source direction) parameters of each monaural static filter in the selected audio TLDR as scalar values. A static filter may be configured by audio TLDR configuration module 920 to mimic those components of an HRTF that are substantially constant and independent of location relative to the user (e.g., the center frequency, gain and Q values configured for the static filter). For example, the static filters may be viewed as approximating a shape of one or more HRTFs, as well as allowing for an adjustment of the overall coloration (e.g., spectral profile, equalization, etc.) of the generated spatialized audio content. In one example, a static filter may be adjusted to match the coloration of a true HRTF so that the final binaural output may feel more natural from an aesthetic standpoint to the user. Thus, the configuration of a static filter may involve adjusting parameter values of the filter (e.g., any of the center frequency, gain, and Q values) in a manner that is independent of the location of the sound source but is aesthetically suitable for the user. Audio TLDR configuration module 920 may configure a static filter for applying to audio signals received at a single channel. In embodiments where the selected audio TLDR has a plurality of static filters, the plurality of static filters may process an incoming single channel audio signal in series, in parallel, or a combination thereof. A static filter may include, for example, a static high shelf filter, a static notch filter, another type of filter, or a combination thereof.

Dynamic filters in the selected audio TLDR may process an input audio signal to generate spatialized audio content that appears to be originating from a particular spatial location relative to the user. The dynamic filters in the selected audio TLDR may include monaural dynamic filters as well as binaural dynamic filters. In contrast to a static filter, the filter parameters of a dynamic filter, either monaural or binaural, may be based in part on the target location relative to the location of the user (e.g., specified by azimuth and elevation angles). The monaural dynamic filters may be coupled to the monaural static filters described above in the single channel. The binaural dynamic filters may be coupled in each individual channel of multiple audio channels (such as a connected left channel and a connected right channel). The binaural dynamic filters may be used to reproduce frequency-dependent interaural level differences (ILD) across the ears, including contralateral head shadow as well as pinna-shadow effects observed in the rear hemifield. The binaural dynamic filters may include, for example, a peak filter, a high-shelf filter, and the like, and may be applied in series to each audio channel signal of the multiple audio channels. While a same general type of dynamic filter (e.g., peak filter) may be configured for multiple audio channel signals, the specific shape of each filter may be different. Typical HRTFs of users may have a first peak at around 4-6 kHz and a main notch at around 5-7 kHz. In some embodiments, the monaural dynamic audio filters may be configured to produce such a main first peak (e.g., at around 4-6 kHz) and such a main notch (e.g., at around 5-7 kHz) that are found in typical HRTFs. In alternate embodiments, the binaural dynamic filters may be configured to produce such a main first peak and main notch.

Audio TLDR configuration module 920 may retrieve one or more models from data store 335 for configuring the selected audio TLDR. The models may include look-up tables, functions, models that have been trained using machine learning techniques, and the like, or a combination thereof. A retrieved model may map various values of target sound source directions to corresponding filter parameter values such as the center frequency/gain/Q triplet values (or other combinations of filter parameters characterizing the filters). In some embodiments, the model may be represented as one or more look-up tables that use input azimuth and/or elevation parameter values to output linearly interpolated values for the triplet values. For example, as described above, lower-dimensional parameters of the HRTFs for a sound source direction, such as parameters of filters for implementing the HRTFs, may be determined using the techniques disclosed herein. The lower-dimensional parameters (e.g., parameters of filters) and the corresponding sound source direction may be saved in the look-up tables, such that the parameters of the filters for implementing the HRTFs may be retrieved using the sound source direction. In some embodiments, the model may map the received azimuth and/or elevation parameter input values to the dynamic filter parameters by interpolating one-dimensional look-up tables. In some embodiments, the model may map both the received azimuth and elevation parameters to dynamic filter parameters by interpolating one-dimensional look-up tables. In some embodiments, the model may map both the received azimuth and elevation parameter input values to the dynamic filter parameters by interpolating two-dimensional look-up tables.

Audio TLDR configuration module 920 may configure the dynamic filters of the selected audio TLDR with the target frequency/gain/Q triplet values (or other filter parameters) using the retrieved model based on the input target source direction. Audio TLDR configuration module 920 may use retrieved one-dimensional interpolating look-up tables to input either one of azimuth or elevation values from the input target sound source direction in order to obtain filter parameters such as the center frequency/gain/Q triplet values (or other filter parameters). Alternatively, audio TLDR configuration module 920 may use retrieved one-dimensional interpolating look-up tables to input both azimuth and elevation values for the input target sound source direction in order to obtain filter parameters such as the center frequency/gain/Q triplet values. Using the two-dimensional look-up tables may allow for a much closer approximation of a given HRTF.

In some embodiments, audio TLDR configuration module 920 may configure a fractional delay between a left audio channel and a right audio channel. For example, audio TLDR configuration module 920 may determine an amount of delay to be applied based on the input target location using a model (such as a look-up table) retrieved from data store 335. The delay may be determined based on, for example, the interaural time difference (ITD) between the sound signal received by the IED in the left ear and the sound signal received by the IED in the right ear during the HRTF determination described above, and may be saved along with the corresponding sound source direction to a look-up table so that the delay may be retrieved based on the target source direction. The configured delay may be a fractional delay or a non-fractional delay that mimics the delay between sound incident on different ears based on a position of the sound source relative to the user, thereby reproducing the interaural time difference (ITD). For example, if the sound source is to the right of a user, sound from the sound source may be rendered at the right ear before being rendered at the left ear. Audio TLDR configuration module 920 may determine the delay by, for example, inputting the target location (e.g., azimuth and/or elevation angles) into the model (e.g., a look-up table).

Audio TLDR application module 930 may apply the configured audio TLDR to an audio signal received at a single channel to generate spatialized audio content for multiple audio channels (e.g., the left and right audio channels). Audio TLDR application module 930 may ensure that the (mono) audio signal received at the single channel is processed by any monaural static filters and monaural dynamic filters (if any) in the configured audio TLDR. The (possibly processed) audio signal may subsequently be split into individual signals (such as a left signal and a right signal) for subsequent processing by any binaural filters in the configured audio TLDR. Audio TLDR application module 930 may also ensure that the generated spatialized audio content at the individual channels of the multiple channels is provided to the transducer array (e.g., at the headset or the IEDs) for presentation to the user. Thus, the set of configured monaural static filters and the set of configured monaural dynamic filters may be connected via a single channel for receiving and outputting a single channel audio signal. Furthermore, the set of configured binaural dynamic filters may be connected via corresponding left and right channels for receiving the single channel audio signal and outputting the corresponding left and right audio signals. In some embodiments, audio TLDR application module 930 may also generate spatialized audio content for additional audio channels. Audio TLDR application module 930 may provide the generated spatialized audio content to transducer array 310 for presenting the spatialized audio content to the user.

Figure 10:
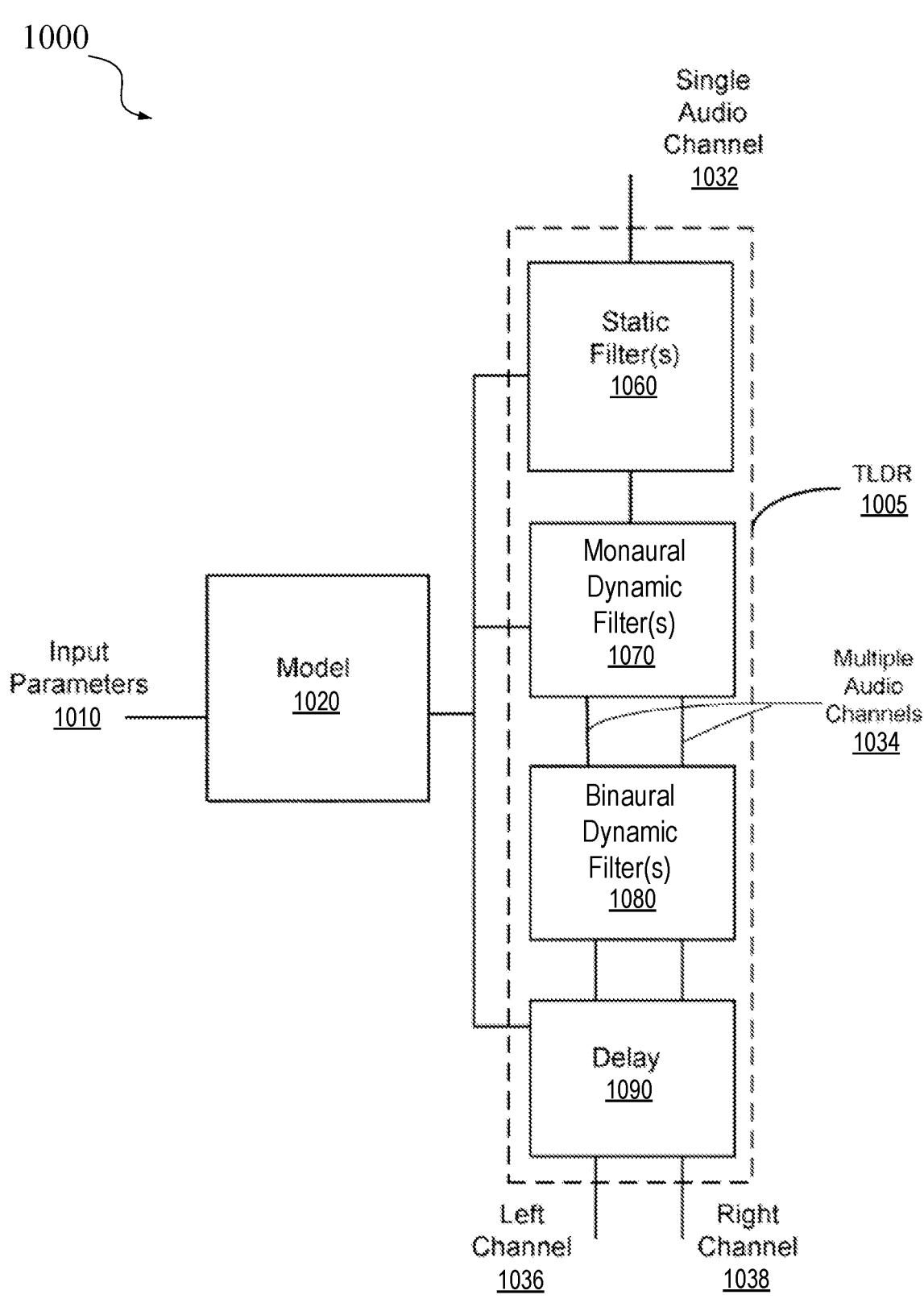
FIG. 10 is a functional block diagram of an example of an audio time and level difference renderer (TLDR) for processing a single channel input audio signal to generate spatialized audio content for multiple channels, according to certain embodiments.

FIG. 10 is a functional block diagram 1000 illustrating an example of an audio TLDR 1005 for processing a single channel input audio signal and generating spatialized audio content for multiple channels, according to certain embodiments. Audio TLDR 1005 may be an audio TLDR that has been selected and configured by sound filter subsystem 900. In some embodiments, there may be additional or different elements or elements arranged in an order different from the order depicted herein.

In some embodiments, input parameters 1010 to audio TLDR 1005 may include the target sound source direction, such as the target azimuth angle and target elevation angle. A model 1020 in FIG. 10 may be the model, such as look-up tables, functions, and the like, for obtaining filter parameter values for static filters, dynamic filters, and delay in audio TLDR 1005. In some embodiments, model 1020 may be obtained from data store 335. Model 1020 may be any of the models described with respect to FIG. 9. Thus, in some embodiments, model 1020 may include one-dimensional and two-dimensional interpolating look-up tables that can be used to obtain filter parameter values as well as the delay values based on the input sound source direction values such as azimuth and/or elevation parameter values.

An audio signal may be provided as input to audio TLDR 1005 at a single audio channel 1032 of the selected audio TLDR 1005. The input audio signal may be processed by audio TLDR 1005 to generate spatialized multi-channel audio signals for presentation to a user (e.g., via a headset or IEDs). The input audio signal may be provided as input to one or more static filters 1060. Static filters 1060 may be any of the static filters described above with respect to FIG. 9, such as monaural static filters. The audio signal processed by static filters 1060 may subsequently be provided to one or more monaural dynamic filters 1070. Monaural dynamic filters 1070 may be any of the monaural dynamic filters described above with respect to, for example, FIG. 9. Monaural dynamic filters 1070 may receive an input audio signal via the single audio channel 1032 and/or static filters 1060, and may provide processed output audio signals to one or more binaural dynamic filters 1080 in multiple audio channels 1034.

Binaural dynamic filters 1080 may be any of the binaural dynamic filters described above with respect to, for example, FIG. 9. In some embodiments, the output audio signal from monaural filters (e.g., one or more of static filters 1060 and/or monaural dynamic filters 1070) may be split and provided as input to binaural dynamic filters 1080 via multiple audio channels 1034. Multiple audio signals may be generated as outputs of binaural dynamic filters 1080 at the multiple audio channels. In some embodiments, the audio signals in the multiple audio channels may be processed by a delay unit 1090 to enforce a delay between the channels, as described with respect to, for example, FIG. 9. The spatialized audio content generated at the multiple audio channels may include output audio content to a left channel 1036 and output audio content to a right channel 1038. While FIG. 10 depicts the flow of an input mono audio signal via single audio channel 1032 and multiple audio channels 1034 in a particular order, other embodiments may use different orders for processing the mono audio channel by audio TLDR 1005 to generate the multi-channel spatialized audio content.

Figure 11:
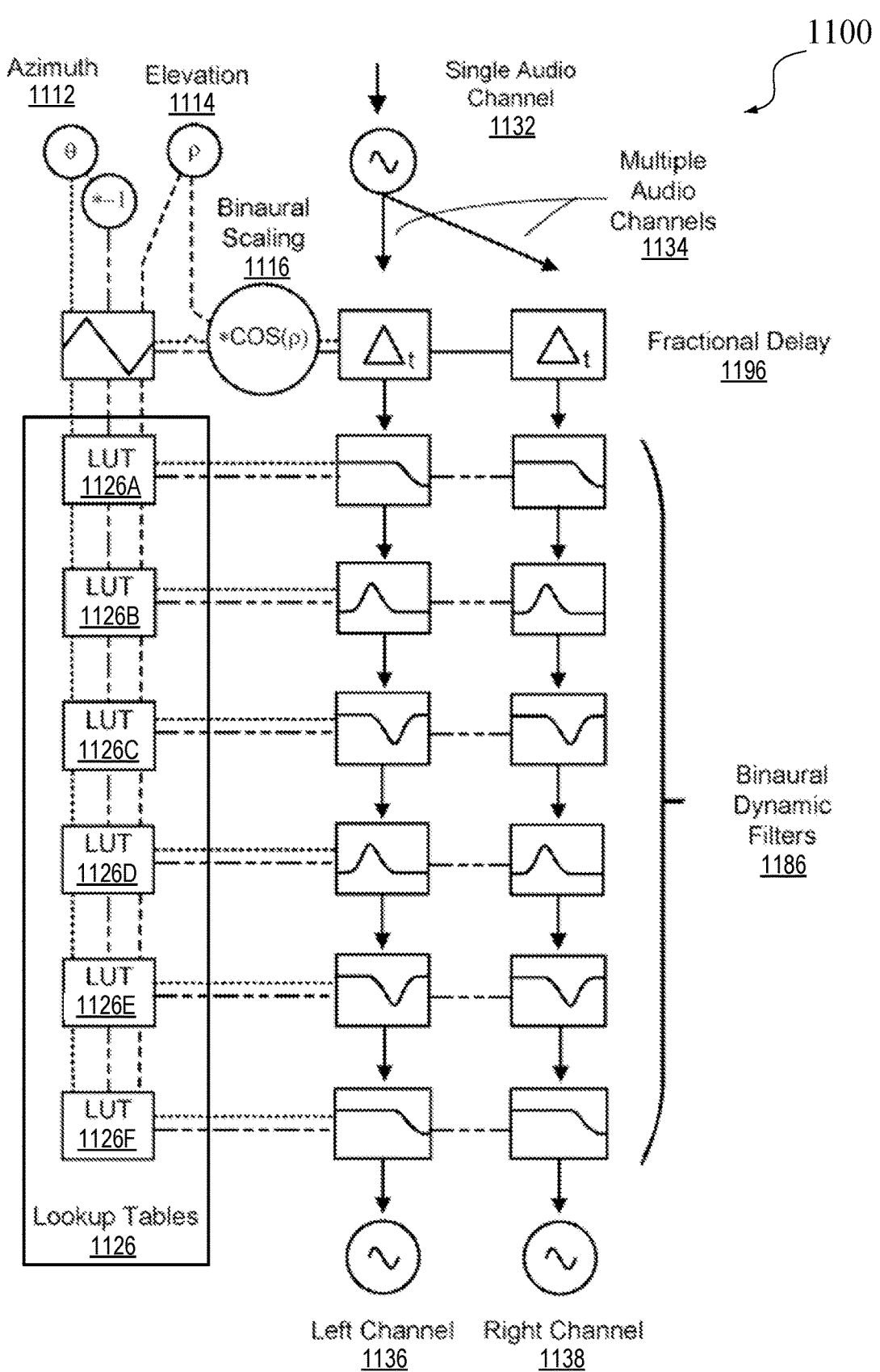
FIG. 11 illustrates an example of an implementation of an audio TLDR that generates spatialized audio content based on an approximation of a personalized HRTF, according to certain embodiments.

FIG. 11 illustrates an example of an audio TLDR 1100 that can generate spatialized audio content based on an approximation of a personalized HRTF, according to certain embodiments. In the illustrated example, audio TLDR 1100 may be selected as described above with respect to FIGS. 9 and 10, and may have been configured based on the input azimuth angle ($\theta$) 1112 and elevation angle ($\rho$) 1114 that specify a target sound source direction, and a model (e.g., look-up tables 1126) that maps a target sound source direction to parameters of filters and/or delays as described above. In the illustrated example, a mono audio signal received at a single audio channel 1132 may be processed by audio TLDR 1100 to generate multi-channel spatialized audio signals at a left channel 1136 and a right channel 1138.

The input audio signal received at single audio channel 1132 may be processed by any static and/or dynamic monaural filters (not shown) before being split and provided as input to multiple audio channels 1134. Since the binaural properties of some of the filters may change with elevation values, in some embodiments, the inputs to multiple audio channels 1134 may be scaled by a binaural scaling unit 1116, for example, using the cosine of elevation angle ($\rho$) 1114 of the target sound source. In the illustrated example, the configured audio TLDR 1100 includes dynamic binaural filters 1186, and an associated fractional delay 1196. Dynamic binaural filters 1186 may have been configured using two-dimensional interpolating look-up tables 1126A, 1126B, 1126C, 1126D, 1126E, and 1126F. These tables may be looked up using both the azimuth and the elevation values of the input target sound source direction. Using the two-dimensional look-up tables may allow for a close approximation of a given HRTF, such as approximating the spectral shape of any given HRTF with an error less than one decibel across the human hearing range (e.g., up to about 20 kHz, such as from about 5 kHz to about 13 kHz).

In some examples, an HRTF may alternatively or additionally be personalized by scaling parameters (e.g., frequency, gain, Q, slope, or other parameters) in the HRTF, such that the spectral envelope of the HRTF translates linearly on a logarithmic frequency scale, and/or by personalizing frequency-dependent phase delay difference between the left and right HRTFs. In one example, the HRTF may be personalized by personalizing factors for compressing or stretching the magnitude spectrum of the HRTF in frequency domain (referred to herein as the frequency scaling factor).

In some embodiments, the audio controller or another processing unit may generate a model and/or look-up tables that map personalized ITDs and personalized frequency scaling factors for personalizing non-personalized HRTFs for various target positions (azimuth and/or elevation angles). In HRTFs, spectral features such as notches and peaks may provide cues to the direction and coloration of sound. The frequencies of these spectral features may differ systematically among users, depending on body features of the users. Scaling the non-personalized HRTF in frequency domain may lead to personalized HRTFs. The frequency scaling may include resampling the HRTF by changing the sampling frequency, while keeping the sampling frequency of the audio signal unchanged, before processing the audio signal with the resampled HRTF. The ratio of the two sampling frequencies may be referred to as the frequency scaling factor or simply scaling factor. The frequency scaling may introduce errors in the interaural time differences (ITDs). According to certain embodiments, the errors in the ITDs introduced by the frequency scaling may be compensated such that the resultant ITD matches that of the original, non-personalized HRTF. In addition, the ITD and the frequency scaling factor may be personalized by, for example, adjusting the ITD and the frequency scaling factor based the user's head width, interpupillary distance, and/or other anatomical markers; adjusting the ITD and the frequency scaling factor based on user feedback on the direction of the sound source perceived by the user based on the audio content rendered to both ears of the user using the ITD and the frequency scaling factor; adjusting the ITD and the frequency scaling factor based on user feedback on the signal strength of audio content rendered to both ears of the user using the ITD and the frequency scaling factor; or a combination thereof.

Figure 12:
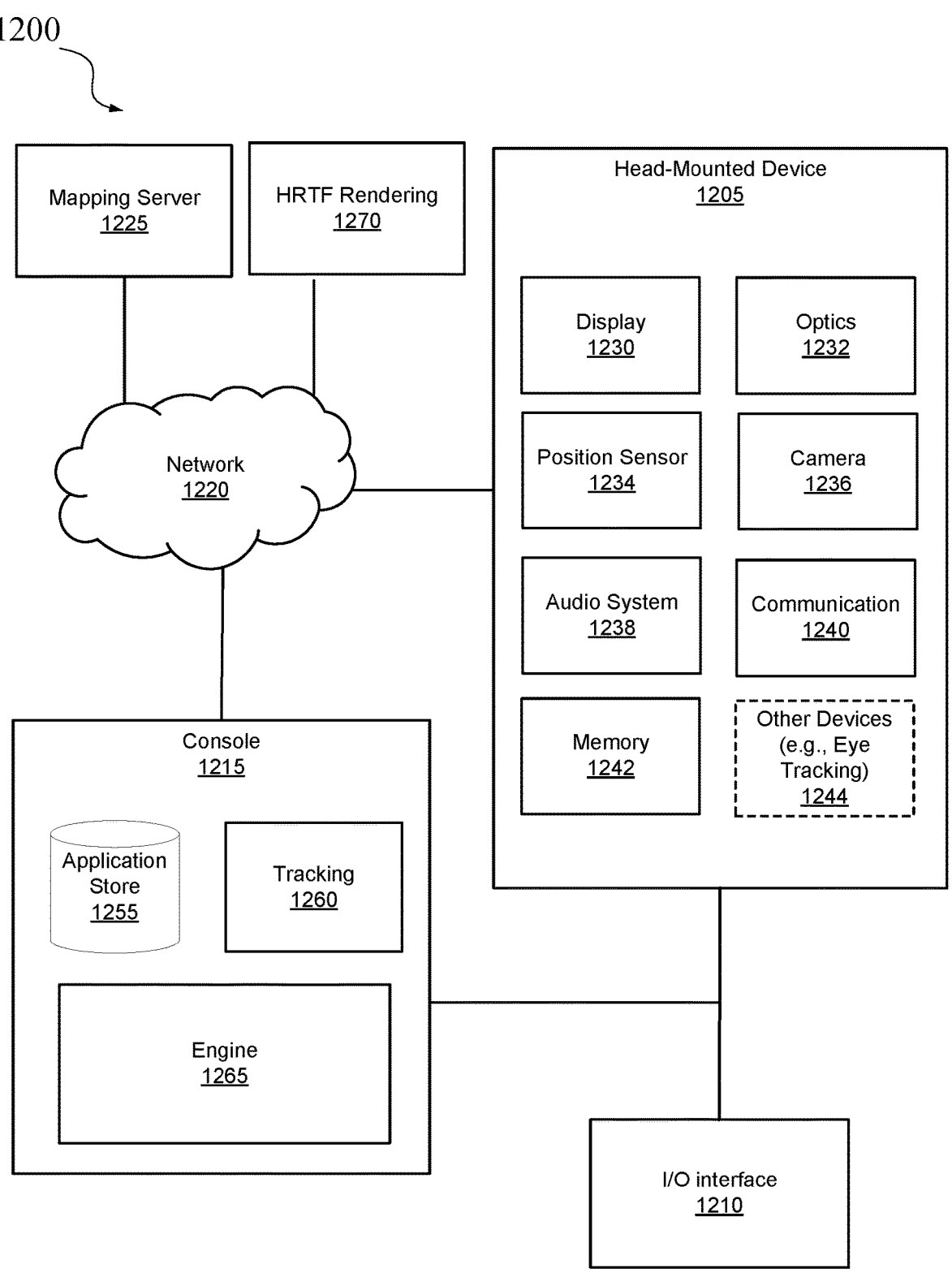
FIG. 12 depicts a block diagram of an example of a system that includes a head-mounted device for implementing some examples disclosed herein according to certain embodiments.

FIG. 12 depicts a block diagram of a system 1200 that includes a head-mounted device 1205 for implementing some examples disclosed herein according to certain embodiments. In some embodiments, head-mounted device 1205 may be NED 100 of FIG. 1 or HMD 200 of FIG. 2. System 1200 may operate in an artificial reality environment (e.g., a virtual reality environment, an augmented reality environment, a mixed reality environment, or a combination thereof). The example of system 1200 shown in FIG. 12 includes head-mounted device 1205, a console 1215, an input/output (I/O) interface 1210 that is coupled to console 1215, a network 1220, a mapping server 1225, and an HRTF rendering system 1270. While FIG. 12 shows an example of system 1200 including one head-mounted device 1205 and one I/O interface 1210, in other embodiments any number of these components may be included in system 1200. For example, there may be multiple head-mounted devices each having an associated I/O interface 1210, with each head-mounted device and I/O interface 1210 communicating with console 1215. In alternative configurations, different and/or additional components may be included in system 1200. Additionally, functionality described in conjunction with one or more of the components shown in FIG. 12 may be distributed among the components in a different manner than described in conjunction with FIG. 12 in some embodiments. For example, some or all of the functionality of console 1215 may be provided by head-mounted device 1205.

Head-mounted device 1205 may include a display assembly 1230, display optics 1232, one or more position sensors 1234, and one or more cameras 1236, an audio system 1238, a communication subsystem 1240, memory 1242, and one or more other devices 1244, such as an eye-tracking subsystem. Some embodiments of head-mounted device 1205 have different components than those described in conjunction with FIG. 12. Additionally, the functionality provided by various components described in conjunction with FIG. 12 may be differently distributed among the components of head-mounted device 1205 in other embodiments, or be captured in separate assemblies remote from head-mounted device 1205.

Display assembly 1230 may display content to the user in accordance with data received from console 1215. Display assembly 1230 may display the content using one or more display elements (e.g., display elements 120). A display element may be, e.g., an electronic display. In various embodiments, display assembly 1230 may include a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a micro-LED display, a light emitting polymer display (LPD), a waveguide display, another type of display, or a combination thereof. Note in some embodiments, the display element may also include some or all of the functionality of display optics 1232.

Display optics 1232 may magnify image light received from the electronic display, correct optical errors associated with the image light, and present the corrected image light to one or both eye-boxes of head-mounted device 1205. In various embodiments, display optics 1232 may include one or more optical elements. Examples of optical elements included in display optics 1232 include: an aperture, a Fresnel lens, a convex lens, a concave lens, a filter, a reflecting surface, or any other suitable optical element that affects image light. Moreover, display optics 1232 may include combinations of different optical elements. In some embodiments, one or more of the optical elements in display optics 1232 may have one or more coatings, such as partially reflective or anti-reflective coatings.

Magnification and focusing of the image light by display optics 1232 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, display optics 1232 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and display optics 1232 corrects the distortion when it receives image light from the electronic display generated based on the content.

Each position sensor 1234 is an electronic device that generates data indicating a position of head-mounted device 1205. Position sensor 1234 may generate one or more measurement signals in response to motion of head-mounted device 1205. Position sensor 190 may be an example of position sensor 1234. Examples of a position sensor 1234 include: one or more IMUs, one or more accelerometers, one or more gyroscopes, one or more magnetometers, another suitable type of sensor that detects motion, or a combination thereof. Position sensor 1234 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of head-mounted device 1205 from the sampled data. For example, the IMU integrates the measurement signals received from the accelerometers over time to estimate a velocity vector and integrates the velocity vector over time to determine an estimated position of a reference point on head-mounted device 1205. The reference point is a point that may be used to describe the position of head-mounted device 1205. While the reference point may generally be defined as a point in space, however, in practice the reference point is defined as a point within head-mounted device 1205.

One or more cameras 1236 may form a depth camera assembly (DCA) for generating depth information for a portion of the local area. The DCA may include one or more cameras and a DCA controller, and optionally an illuminator. Operations and structures of the DCA and cameras 1236 are described above with regard to, for example, FIG. 1.

Audio system 1238 may provide audio content to a user of head-mounted device 1205. Audio system 1238 may be substantially similar to audio system 300 describe above. Audio system 1238 may include one or acoustic sensors, one or more transducers, and an audio controller. In some embodiments, audio system 1238 may include in-ear devices that include microphones and speakers (e.g., transducers). Audio system 1238 may provide spatialized audio content to the user. In some embodiments, audio system 1238 may request acoustic parameters from mapping server 1225 over network 1220. The acoustic parameters describe one or more acoustic properties (e.g., room impulse response, a reverberation time, a reverberation level, etc.) of the local area. Audio system 1238 may provide information describing at least a portion of the local area from, for example, the DCA and/or location information for head-mounted device 1205 from position sensors 1234. Audio system 1238 may generate one or more sound filters using one or more of the acoustic parameters received from mapping server 1225 and use the sound filters to provide audio content to the user. In some embodiments, the audio system performs parametric selection of a suitable audio time and level difference renderer (TLDR) for generating spatialized audio content. The system may use input parameters to select an audio TLDR from a set of possible audio TLDRs for generating spatialized audio content from a single channel input audio signal (e.g., mono-channel). A selected audio TLDR may be configured using use static and dynamic monaural and binaural filters and delays to simulate applying an approximation of a given HRTF to an input audio signal. The audio system uses the selected and configured audio TLDR to generate multi-channel spatialized audio content for presenting to the user via the headset. Various audio TLDRs may provide varying levels of accuracy in approximating the given HRTF. In some embodiments, the input parameters used for selecting and configuring an audio TLDR may include target device metrics such as a target power consumption, target compute load, etc., and/or a target level of accuracy in approximating an HRTF.

Communication subsystem 1240 may include, for example, a modem, a network card (wireless or wired), an infrared communication device, a wireless communication device and/or chipset (such as a Bluetooth® device, an IEEE 802.11 device, a Wi-Fi device, a WiMax device, cellular communication facilities, etc.), and/or similar communication interfaces. In some embodiments, system 1200 may include one or more antennas for wireless communication as part of communication subsystem 1240 or as a separate component coupled to any portion of the system. Depending on desired functionality, communication subsystem 1240 may include separate transceivers to communicate with base transceiver stations and other wireless devices and access points, which may include communicating with different data networks and/or network types, such as wide-area networks ("WANs"), wireless wide-area networks (WWANs), local area networks (LANs), wireless local area networks (WLANs), personal area networks (PANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WAN, LAN, PAN, WWAN, WLAN, and/or WPAN. Communication subsystem 1240 may permit data to be exchanged with a network, other computer systems, and/or any other devices described herein. Communication subsystem 1240 may include a means for transmitting or receiving data, such as text, photos, audios, or videos. Communication subsystem 1240, the processor(s), memory 1242 may together comprise at least a part of one or more of a means for performing some functions disclosed herein.

Memory 1242 may be coupled to one or more processors. In some embodiments, memory 1242 may offer both short-term and long-term storage and may be divided into several units. Memory 1242 may be volatile, such as static random access memory (SRAM) and/or dynamic random access memory (DRAM), and/or non-volatile, such as read-only memory (ROM), flash memory, solid-state drive, and the like. Furthermore, memory 1242 may include removable storage devices, such as secure digital (SD) cards. Memory 1242 may provide storage of computer-readable instructions, data structures, program modules, and other data for system 1200. In some embodiments, memory 1242 may be distributed into different hardware modules. A set of instructions and/or code might be stored on memory 1242. The instructions might take the form of executable code that may be executable by system 1200, and/or might take the form of source and/or installable code, which, upon compilation and/or installation on system 1200 (e.g., using any of a variety of generally available compilers, installation programs, compression and/or decompression utilities, etc.), may take the form of executable code. Memory 1242 may include an operating system loaded therein. The operating system may be operable to initiate the execution of the instructions provided by application modules and/or manage other hardware, as well as interface with communication subsystem 1240 which may include one or more wired and/or wireless transceivers. The operating system may be adapted to perform other operations across the components of system 1200 including threading, virtualization, resource management, data storage control, and other similar functionality. In some embodiments, memory 1242 may store a plurality of application modules, which may include any number of applications.

In some embodiments, head-mounted device 1205 may include one or more other devices 1244. Each of other devices 1244 may be a physical subsystem. While each of other devices 1244 may be permanently configured as a structure, some of other devices 1244 may be temporarily configured to perform specific functions or temporarily activated. Examples of other devices 1244 may include, for example, an eye-tracking unit, a near field communication (NFC) device, a rechargeable battery, a battery management system, a wired/wireless battery charging system, and the like. In some embodiments, one or more functions of other devices 1244 may be implemented in software.

The eye-tracking unit may include one or more eye-tracking systems. Eye tracking may refer to determining an eye's position, including orientation and location of the eye, relative to head-mounted device 1205. An eye-tracking system may include an imaging system to image one or more eyes and may optionally include a light emitter, which may generate light that is directed to an eye such that light reflected by the eye may be captured by the imaging system. For example, the eye-tracking unit may include a non-coherent or coherent light source (e.g., a laser diode) emitting light in the visible spectrum or infrared spectrum, and a camera capturing the light reflected by the user's eye. As another example, the eye-tracking unit may capture reflected radio waves emitted by a miniature radar unit. The eye-tracking unit may use low-power light emitters that emit light at frequencies and intensities that would not injure the eye or cause physical discomfort. The eye-tracking unit may be arranged to increase contrast in images of an eye captured by the eye-tracking unit while reducing the overall power consumed by the eye-tracking unit (e.g., reducing power consumed by a light emitter and an imaging system included in the eye-tracking unit). For example, in some implementations, the eye-tracking unit may consume less than 120 milliwatts of power. Head-mounted device 1205 may use the orientation of the eye to, e.g., determine an inter-pupillary distance (IPD) of the user, determine gaze direction, introduce depth cues (e.g., blur image outside of the user's main line of sight), provide foveated display to reduce power consumption, collect heuristics on the user interaction in the VR media (e.g., time spent on any particular subject, object, or frame as a function of exposed stimuli), perform some other functions that are based in part on the orientation of at least one of the user's eyes, or any combination thereof. For example, because the orientation may be determined for both eyes of the user, the eye-tracking unit may be able to determine where the user is looking, and thus head-mounted device 1205 may generate images with high resolution/intensity for some regions of the display and lower resolution/intensity for other regions of the display.

I/O interface 1210 is a device that allows a user to send action requests and receive responses from console 1215. An action request is a request to perform a particular action. For example, an action request may be an instruction to start or end capture of image or video data, or an instruction to perform a particular action within an application. I/O interface 1210 may include one or more input devices. Example input devices include: a keyboard, a mouse, a game controller, or any other suitable device for receiving action requests and communicating the action requests to console 1215. An action request received by I/O interface 1210 is communicated to console 1215, which performs an action corresponding to the action request. In some embodiments, I/O interface 1210 includes an IMU that captures calibration data indicating an estimated position of I/O interface 1210 relative to an initial position of I/O interface 1210. In some embodiments, I/O interface 1210 may provide haptic feedback to the user in accordance with instructions received from console 1215. For example, haptic feedback is provided when an action request is received, or console 1215 communicates instructions to I/O interface 1210 causing I/O interface 1210 to generate haptic feedback when console 1215 performs an action.

Console 1215 provides content to head-mounted device 1205 for processing in accordance with information received from one or more of: the DCA, head-mounted device 1205, and I/O interface 1210. In the example shown in FIG. 12, console 1215 includes an application store 1255, a tracking module 1260, and an engine 1265. Some embodiments of console 1215 have different modules or components than those described in conjunction with FIG. 12. Similarly, the functions further described below may be distributed among components of console 1215 in a different manner than described in conjunction with FIG. 12. In some embodiments, the functionality discussed herein with respect to console 1215 may be implemented in head-mounted device 1205, or a remote system.

Application store 1255 may store one or more applications for execution by console 1215. An application is a group of instructions, that when executed by a processor, generates content for presentation to the user. Content generated by an application may be in response to inputs received from the user via movement of head-mounted device 1205 or I/O interface 1210. Examples of applications include: gaming applications, conferencing applications, video playback applications, or other suitable applications.

Tracking module 1260 may track movements of head-mounted device 1205 or of I/O interface 1210 using information from the DCA, the one or more position sensors 1234, or a combination thereof. For example, tracking module 1260 may determine a position of a reference point of head-mounted device 1205 in a mapping of a local area based on information from head-mounted device 1205. Tracking module 1260 may also determine positions of an object or virtual object. Tracking module 1260 may also determine positions of the torso of an object with respect to the head of the object. Additionally, in some embodiments, tracking module 1260 may use portions of data indicating a position of head-mounted device 1205 from position sensor 1234 as well as representations of the local area from the DCA to predict a future location of head-mounted device 1205. Tracking module 1260 may provide the estimated or predicted future position of head-mounted device 1205 or I/O interface 1210 to engine 1265.

Engine 1265 may execute applications and receives position information, acceleration information, velocity information, predicted future positions, or a combination thereof, of head-mounted device 1205 from tracking module 1260. Based on the received information, engine 1265 may determine content to provide to head-mounted device 1205 for presentation to the user. For example, if the received information indicates that the user has looked to the left, engine 1265 may generate content for head-mounted device 1205 that mirrors the user's movement in a virtual local area or in a local area augmenting the local area with additional content. Additionally, engine 1265 may perform an action within an application executing on console 1215 in response to an action request received from I/O interface 1210 and provides feedback to the user that the action was performed. The provided feedback may be visual or audible feedback via head-mounted device 1205 or haptic feedback via I/O interface 1210.

Network 1220 may couple head-mounted device 1205 and/or console 1215 to mapping server 1225. Network 1220 may include any combination of local area and/or wide area networks using both wireless and/or wired communication systems. For example, network 1220 may include the Internet, as well as mobile telephone networks. In one embodiment, network 1220 uses standard communications technologies and/or protocols. Hence, network 1220 may include links using technologies such as Ethernet, IEEE 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on network 1220 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 1220 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

Mapping server 1225 may include a database that stores a virtual model describing a plurality of spaces, wherein one location in the virtual model corresponds to a current configuration of a local area of head-mounted device 1205. Mapping server 1225 may receive, from head-mounted device 1205 via network 1220, information describing at least a portion of the local area and/or location information for the local area. The user may adjust privacy settings to allow or prevent head-mounted device 1205 from transmitting information to mapping server 1225. Mapping server 1225 may determine, based on the received information and/or location information, a location in the virtual model that is associated with the local area of head-mounted device 1205. Mapping server 1225 may determine (e.g., retrieve) one or more acoustic parameters associated with the local area, based in part on the determined location in the virtual model and any acoustic parameters associated with the determined location. Mapping server 1225 may transmit the location of the local area and any values of acoustic parameters associated with the local area to head-mounted device 1205.

HRTF rendering system 1270 may utilize machine learning models (e.g., neural networks) to fit measured HRTFs with parametric filters. The filters are determined in such a way that the filter parameters vary smoothly across space and behave analogously across different users. The fitting method may use a neural network encoder and a differentiable decoder that utilizes digital signal processing solutions, and may perform an optimization of the weights of the neural network encoder using loss functions to generate one or more models of filter parameters that fit across the database of HRTFs. HRTF rendering system 1270 may provide the filter parameter models periodically, or upon request to audio system 1250 for use in generating spatialized audio content for presentation to a user of head-mounted device 1205. In some embodiments, the provided filter parameter models are stored in the data store of audio system 1238.

One or more components of system 1200 may contain a privacy module that stores one or more privacy settings for user data elements. The user data elements describe the user or head-mounted device 1205. For example, the user data elements may describe a physical characteristic of the user, an action performed by the user, a location of the user of head-mounted device 1205, a location of head-mounted device 1205, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

System 1200 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or a combination thereof, any of which may be presented in a single channel or in multiple channels (such as stereo video that produces a three-dimensional effect to the viewer). Additionally, in some embodiments, artificial reality may also be associated with applications, products, accessories, services, or a combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

Any of the herein described techniques, operations, methods, programs, algorithms, or codes may be converted to, or expressed in, a programming language or computer program embodied on a computer, processor, or machine-readable medium. The terms "programming language" and "computer program," as used herein, each include any language used to specify instructions to a computer or processor, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, from a sensor array of a head-mounted device, a first sound signal associated with a sound from a sound source in a local environment of a user of the head-mounted device;
   determining, based on the first sound signal, that reverberation characteristics and spectral characteristics of the sound meet predetermined criteria;
   determining that the sound source is stationary within a time period;
   determining a relative location of the sound source with respect to the user;
   receiving, from an in-ear device in an ear of the user, a second sound signal associated with the sound from the sound source; and
   determining, based on at least the second sound signal, a head-related transfer function (HRTF) or one or more parameters of the HRTF associated with the relative location of the sound source for the user, the determining of the HRTF including, at least in part, determining a reference signal based on the first sound signal and the determined relative location of the sound source.

2. The method of claim 1, wherein determining the relative location of the sound source with respect to the user includes determining an azimuth angle of the sound source, an elevation angle of the sound source, or a combination thereof with respect to the user.

3. The method of claim 1, wherein determining the relative location of the sound source with respect to the user includes:
   determining a direction of arrival of the sound based on the first sound signal from the senor array and locations of two or more sensors in the sensor array;
   determining the relative location of the sound source with respect to the user based on images captured by one or more cameras on the head-mounted device; or
   a combination thereof.

4. The method of claim 3, wherein determining the relative location of the sound source with respect to the user includes determining a confidence level of the determined relative location of the sound source with respect to the user.

5. The method of claim 1, wherein determining the HRTF or the one or more parameters of the HRTF associated with the relative location of the sound source for the user further includes:
   determining the HRTF or the one or more parameters of the HRTF based on a spectrum of the reference sound signal and a spectrum of the second sound signal.

6. The method of claim 5, wherein determining the reference sound signal includes beamforming in a direction of the relative location of the sound source based on the first sound signal.

7. The method of claim 1, further comprising determining, based on data from one or more position sensors of the head-mounted device, a relative position of the torso of the user with respect to the head of the user.

8. The method of claim 1, further comprising saving the HRTF or the one or more parameters of the HRTF and the relative location of the sound source to a data store that stores a plurality of HRTFs for the user.

9. The method of claim 1, wherein the reverberation characteristics and spectral characteristics of the sound include a signal-to-noise ratio, a frequency range, a reverberation level, a reverberation time, or a combination thereof.

10. The method of claim 1, further comprising generating a model or a look-up table for mapping the relative location of the sound source to the one or more parameters of the HRTF.

11. The method of claim 1, wherein the one or more parameters of the HRTF include parameters of one or more filters or frequency scaling factors for implementing the HRTF.

12. The method of claim 1, further comprising performing operations of the method of claim 1 iteratively to determine HRTFs or parameters of the HRTFs associated with a plurality of sound source directions with respect to the user.

13. The method of claim 1, wherein the time period is greater than 10 milliseconds.

14. A system comprising:

an in-ear device configured to generate a first sound signal associated with a sound from a sound source in a local environment of a user; and a head-mounted device comprising:

a sensor array configured to generate a second sound signal associated with the sound; and an audio controller configured to:

determine, based on the second sound signal, that reverberation characteristics and spectral characteristics of the sound meet predetermined criteria;

determine that the sound source is stationary within a time period;

determine a relative location of the sound source with respect to the user; and determine, based on at least the first sound signal, a head-related transfer function (HRTF) or one or more parameters of the HRTF associated with the relative location of the sound source for the user, the determining of the HRTF including, at least in part, determining a reference signal based on the first sound signal and the determined relative location of the sound source.

15. The system of claim 14, wherein the audio controller is configured to determine an azimuth angle of the sound source, an elevation angle of the sound source, or a combination thereof with respect to the user.

16. The system of claim 14, wherein the audio controller is configured to determine the relative location of the sound source with respect to the user by performing operations including:

determining a direction of arrival of the sound based on the first sound signal from the senor array and locations of two or more sensors in the sensor array;

determining the relative location of the sound source with respect to the user based on images captured by one or more cameras on the head-mounted device; or a combination thereof.

17. The system of claim 14, wherein the audio controller is configured to determine the HRTF or the one or more parameters of the HRTF associated with the relative location of the sound source for the user by performing operations including:

determining the HRTF or the one or more parameters of the HRTF based on a spectrum of the reference sound signal and a spectrum of the second sound signal.

18. The system of claim 17, wherein the reference sound signal is a sound signal at a center of the head of the user determined by beamforming in a direction of the relative location of the sound source based on the second sound signal.

19. The system of claim 14, wherein the one or more parameters of the HRTF include parameters of one or more filters or frequency scaling factors for implementing the HRTF.

20. A system comprising:

one or more processors; and one or more processor-readable media storing instructions which, when executed by the one or more processors, cause the one or more processors to:

receive, from a sensor array of a head-mounted device, a first sound signal associated with a sound from a sound source in a local environment of a user of the head-mounted device;

determine, based on the first sound signal, that reverberation characteristics and spectral characteristics of the sound meet predetermined criteria;

determine that the sound source is stationary within a time period;

determine a relative location of the sound source with respect to the user;

receive, from an in-ear device in an ear of the user, a second sound signal associated with the sound from the sound source; and determine, based on at least the second sound signal, a head-related transfer function (HRTF) or one or more parameters of the HRTF associated with the relative location of the sound source for the user, the determining of the HRTF including, at least in part, determining a reference signal based on the first sound signal and the determined relative location of the sound source.

* * * * *